US011477078B2

(12) United States Patent
Wei et al.

(10) Patent No.: US 11,477,078 B2
(45) Date of Patent: Oct. 18, 2022

(54) DATA TRANSMISSION METHOD AND RELATED APPARATUS

(71) Applicant: HUAWEI TECHNOLOGIES CO., LTD., Shenzhen (CN)

(72) Inventors: Wei Wei, Shenzhen (CN); Chen Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/215,709

(22) Filed: Mar. 29, 2021

(65) Prior Publication Data

US 2021/0218629 A1   Jul. 15, 2021

Related U.S. Application Data

(63) Continuation of application No. PCT/CN2019/105729, filed on Sep. 12, 2019.

(30) Foreign Application Priority Data

Sep. 29, 2018   (CN) .......................... 201811150098.3

(51) Int. Cl.
*H04L 67/101*   (2022.01)
*H04L 41/0816*   (2022.01)
(Continued)

(52) U.S. Cl.
CPC ...... *H04L 41/0816* (2013.01); *H04L 41/0826* (2013.01); *H04L 67/101* (2013.01); *H04L 67/1031* (2013.01); *H04L 67/1097* (2013.01)

(58) Field of Classification Search
CPC ............. H04L 41/0816; H04L 41/0826; H04L 67/101; H04L 67/1031; H04L 67/1097
See application file for complete search history.

(56) References Cited

U.S. PATENT DOCUMENTS

2005/0188073 A1* 8/2005 Nakamichi ............. H04L 45/00
709/239
2009/0327517 A1 12/2009 Sivasubramanian et al.
(Continued)

FOREIGN PATENT DOCUMENTS

CN   101001102 A   7/2007
CN   103139161 A   6/2013
(Continued)

OTHER PUBLICATIONS

Longbin Chen et al., "Supporting high-quality video streaming with SDN-based CDNs",J Supercomput (2017) 73:3547-3561,DOI 10.1007/s11227-016-1649-3,Total 16 Pages.
(Continued)

*Primary Examiner* — Ryan J Jakovac
(74) *Attorney, Agent, or Firm* — Hauptman Ham, LLP

(57) ABSTRACT

A data transmission method includes receiving a service request sent by a terminal device. The method also includes determining, based on the service request, a target transmission path of service data corresponding to the service request and a change policy corresponding to the target transmission path. The method further includes changing, according to the change policy, a current content delivery network (CDN) to a target CDN. The target CDN includes a plurality of serving nodes corresponding to the target transmission path. The method additionally includes sending an indication message to a first serving node in the target CDN to indicate the first serving node to send the service data to the terminal device through the target transmission path; or sending an indication message to a second serving node in the target CDN to indicate the second serving node to send the service data to the terminal device.

19 Claims, 10 Drawing Sheets

(51) Int. Cl.
H04L 41/0826 (2022.01)
H04L 67/1031 (2022.01)
H04L 67/1097 (2022.01)

(56) References Cited

U.S. PATENT DOCUMENTS

| | | | |
|---|---|---|---|
| 2017/0366595 | A1 | 12/2017 | Feher et al. |
| 2018/0159769 | A1 | 6/2018 | Richardson et al. |
| 2019/0215361 | A1* | 7/2019 | Lohmar ............... H04L 65/80 |
| 2021/0014733 | A1* | 1/2021 | Soliman ............... H04M 15/64 |

FOREIGN PATENT DOCUMENTS

| | | |
|---|---|---|
| CN | 105847140 A | 8/2016 |
| CN | 106488380 A | 3/2017 |
| CN | 106803967 A | 6/2017 |
| CN | 106817356 A | 6/2017 |
| CN | 108270750 A | 7/2018 |
| EP | 3193489 A1 | 7/2017 |
| WO | 2016058392 A1 | 4/2016 |

OTHER PUBLICATIONS

H.VCDN.1-NV,"H.VCDN.1-NV "Virtual content delivery network—Network virtualization" (Rev): Updated draft (Shanghai, Mar. 27-29, 2018)",Q21/16-TD16 (180327),Study Group 16,Mar. 27/29, 2018, Total 22 Pages.

Yu-Jie Zhang et al., "Research on CDN-P2P system over user requirements",Ruan Jian Xue Bao, 2013,with an English abstract,total 20 pages.

ITU-T,H.264,Series H: Audiovisual and Multimedia Systems;Infrastructure of audiovisual services Coding of moving video;Advanced video coding for generic audiovisual services,(Apr. 2017),total 812 pages.

ITU-T H.265,Series H: Audiovisual and Multimedia Systems;Infrastructure of audiovisual services Coding of moving video;High efficiency video coding,(Feb. 2018),total 692 pages.

Chinese Notice of Allowance issued in corresponding Chinese Application No. 201811150098.3, dated Mar. 4, 2021, pp. 1-4.

Chinese Office Action issued in corresponding Chinese Application No. 201811150098.3, dated Sep. 22, 2020, pp. 1-5.

International Search Report issued in corresponding International Application No. PCT/CN2019/105729, dated Nov. 28, 2019, pp. 1-8.

* cited by examiner

DATA TRANSMISSION METHOD AND RELATED APPARATUS

CROSS-REFERENCE TO RELATED APPLICATIONS

This application is a continuation of International Application No. PCT/CN2019/105729, filed on Sep. 12, 2019, which claims priority to Chinese Patent Application No. 201811150098.3, filed on Sep. 29, 2018. The disclosures of the aforementioned applications are hereby incorporated by reference in their entireties.

TECHNICAL FIELD

Embodiments of this application relate to the communications field, and in particular, to a data transmission method and a related apparatus.

BACKGROUND

A basic idea of a content delivery network (content delivery network, CDN) is to avoid, as far as possible, a bottleneck and a phase that may affect a data transmission speed and data transmission stability on the internet, so that content transmission is faster and more stable. A request of a user is redirected, by deploying node servers on a network, to a serving node closest to the user in real time based on comprehensive information of network traffic, connection of nodes, load status, distance to the user, response time, and the like. The purpose is to allow the user to obtain required content from the nearest serving node, to resolve a network congestion problem, and improve a response speed at which the user accesses a website.

Generally, when the CDN receives a service request sent by a terminal device, a management apparatus selects, based on the comprehensive information of current network traffic, load status, distance to the user, response time, and the like, a proper transmission path in an existing CDN, to send service data to the user.

In the foregoing solution, because a quantity of serving nodes in the CDN and traffic that can be processed by each serving node are limited, a quantity of transmission paths formed by these serving nodes is also limited and the transmission path has traffic limitation. When the network traffic surges, the transmission path selected by the management apparatus from the existing CDN cannot meet service requirements of a large quantity of users in a short time. This affects user service experience.

SUMMARY

Embodiments of this application provide a data transmission method and a related apparatus, to flexibly use a CDN resource to expand a network capacity, to avoid affecting user service experience.

According to a first aspect, an embodiment of this application provides a data transmission method. When a terminal device has a service requirement, the terminal device may send a service request to a management apparatus. After receiving the service request sent by the terminal device, the management apparatus may determine service data corresponding to the service request, a target transmission path through which the service data is transmitted, and a change policy corresponding to the target transmission path. Then, the management apparatus changes, according to the change policy, a current CDN to obtain a target CDN, and sends an indication message to a first serving node in the target CDN, to indicate the first serving node to send the service data to the terminal device through the target transmission path. Alternatively, the management apparatus changes, according to the change policy, a current CDN to obtain a target CDN, and sends an indication message to a second serving node in the target CDN, to indicate the second serving node to send the service data to the terminal device, where the service data is transmitted to the second serving node through the target transmission path.

It should be noted that the foregoing target CDN includes a plurality of serving nodes corresponding to the target transmission path, and the first serving node is a serving node that stores the service data. There may be one or more terminal devices that send the service request, and the target transmission path includes transmission paths of all terminal devices corresponding to the service request.

In this implementation, after receiving the service request sent by the terminal device, the management apparatus determines, based on the service request, the target transmission path corresponding to the terminal device, and the change policy required for transmitting data on the target transmission path; and changes the current CDN, according to the change policy, to obtain the target CDN, where the target CDN includes each serving node corresponding to the target transmission path, so that the service data corresponding to the service request may be returned to the terminal device by using the serving node corresponding to the target transmission path in the target CDN. In other words, in this solution, the CDN may be flexibly deployed based on the service requirement, and the transmission path may be selected without limiting to the existing CDN. Therefore, when network traffic surges, a CDN resource can be flexibly used to expand a network capacity in a relatively short time, to avoid affecting user service experience.

According to the first aspect, in a first implementation of the first aspect of this implementation, the management apparatus may determine the target transmission path and the change policy in the following manner:

first determining, by the management apparatus, an initial structure parameter, then determining an initial transmission cost value based on the service request and the initial structure parameter, updating, by the management apparatus, the structure parameter for N times to obtain a target structure parameter, and determining the target transmission path and the change policy based on the target structure parameter.

It should be noted that the foregoing structure parameter is used to indicate structure composition of a CDN, and the initial structure parameter is a structure parameter corresponding to the current CDN. The transmission cost value is a minimum cost value required for returning the service data to the terminal device in the CDN indicated by the structure parameter. N is a quantity of update times required for converging the transmission cost value, or a preset maximum quantity of update times. In addition, the target transmission path is a transmission path corresponding to a target transmission cost value, the target transmission cost value is a transmission cost value determined based on the target structure parameter, and the change policy includes the target structure parameter or a change operation corresponding to the N times of update.

In this implementation, a manner in which the management apparatus determines, based on the service request, the target transmission path of the service data corresponding to the service request is specified, and a manner in which the management apparatus determines the change policy corresponding to the target transmission path is also specified. In this process, the management apparatus needs to first determine the structure parameter used to indicate the structure composition of the CDN, then determine, by using the structure parameter, the minimum cost value required for returning the service data to the terminal device, further update the structure parameter, and calculate a new transmission cost by using a new structure parameter. The process is repeated for a plurality of times, and the management apparatus can search out, from the entire CDN, at least one target transmission path that is low costly and can meet the service requirement. Because the process of determining the target transmission path and the change policy is a process that requires a large amount of strict calculation, and this calculation process is heuristic to search for the best transmission path, feasibility of the situation can be improved.

According to the first implementation of the first aspect, in a second implementation of the first aspect of this implementation, the structure parameter includes at least one of the following: a quantity of central serving nodes, a quantity of transit serving nodes, a quantity of edge serving nodes, a bandwidth connected between serving nodes, or a service function of a serving node.

In this implementation, content of the structure parameter is specified, and the structure parameter includes at least the quantity of central serving nodes, the quantity of transit serving nodes, the quantity of edge serving nodes, the bandwidth connected between serving nodes, and the service function of the serving node. Therefore, feasibility of the solution is improved.

According to the first implementation of the first aspect or the second implementation of the first aspect, in a third implementation of the first aspect of this implementation, the updating, by the management apparatus, the structure parameter for N times to obtain a target structure parameter may be implemented in one or a centralized manner of the following:

adjusting, by the management apparatus, a quantity and deployment locations of serving nodes; adjusting a value of a bandwidth connected between at least two serving nodes; and adding at least one of the following service functions for at least one serving node, such as converting a coding scheme of data, caching data, and forwarding data.

In this implementation, a plurality of manners of updating the structure parameter to obtain the target structure parameter are separately listed, and are respectively changing the quantity and the deployment locations of serving nodes, adjusting the bandwidth between serving nodes, and adjusting the function of the serving node. Because one of the plurality of manners may be selected to update the structure parameter, or the plurality of manners may be used to update the structure parameter. Therefore, implementation flexibility of the solution is improved. In addition, different quantities may be set in specific implementation of each manner of updating the structure parameter to obtain the target structure parameter. For example, the serving node is classified into three types: a central serving node, a transit serving node, and an edge serving node. In specific implementation, the three types of serving nodes may be properly combined, to obtain a plurality of different effects of updating the structure parameter. Therefore, the update steps are diversified, and can meet requirements of a large quantity of different users.

According to the first implementation of the first aspect or the second implementation of the first aspect, in a fourth implementation of the first aspect of this implementation, the determining, by the management apparatus, an initial transmission cost value based on the service request and the initial structure parameter includes the following steps:

first determining, by the management apparatus, a bandwidth requirement corresponding to the service request, then determining at least one transmission scheme that meets the bandwidth requirement and that is in the CDN indicated by the initial structure parameter, then determining, based on serving node deployment costs, bandwidth leasing costs, and a network delay, a cost value corresponding to each transmission scheme, and finally determining a minimum value of the cost value as the initial transmission cost value.

In this implementation, a step in which determines the management apparatus the initial transmission cost value based on the service request and the initial structure parameter is specified. When the management apparatus meets the bandwidth requirement corresponding to the service request of the user, the management apparatus may determine, based on the serving node deployment costs, the bandwidth leasing costs, and the network delay, the cost value of each transmission path, and determine the minimum value of the cost value as the initial transmission cost value. Therefore, feasibility of the solution is improved.

According to any one of the first aspect, or the first implementation of the first aspect and the second implementation of the first aspect, in a fifth implementation of the first aspect of this implementation, when the change policy is used to indicate that the target CDN does not include a third serving node and a bandwidth correspondingly connected to the third serving node, the changing, by the management apparatus according to the change policy, a current CDN managed by the management apparatus to a target CDN includes:

if the current CDN includes the third serving node, suspending, by the management apparatus according to the change policy, leasing of the third serving node in the current CDN and the bandwidth correspondingly connected to the third serving node.

In this implementation, a step in which, when the target CDN does not include the third serving node and the bandwidth correspondingly connected to the third serving node, the management apparatus changes the current CDN to the target CDN according to the change policy is specified. Therefore, feasibility of the solution is improved.

According to any one of the first aspect, or the first implementation of the first aspect and the second implementation of the first aspect, in a sixth implementation of the first aspect of this implementation, when the change policy is used to indicate that the target CDN includes a fourth serving node and a bandwidth correspondingly connected to the fourth serving node, the changing, by the management apparatus according to the change policy, a current CDN managed by the management apparatus to a target CDN includes:

if the current CDN does not include the fourth serving node, leasing, by the management apparatus according to the change policy, the fourth serving node and the bandwidth correspondingly connected to the fourth serving node, where the target transmission path includes the fourth serving node.

In this implementation, a step in which, when the target CDN includes the fourth serving node and the bandwidth correspondingly connected to the fourth serving node, the management apparatus changes the current CDN to the target CDN according to the change policy is specified. Therefore, feasibility of the solution is improved.

According to any one of the first aspect, or the first implementation of the first aspect and the second implementation of the first aspect, in a seventh implementation of the first aspect of this implementation, when the change policy is used to indicate a target bandwidth correspondingly connected between at least two serving nodes in the target CDN, the changing, by the management apparatus according to the change policy, a current CDN managed by the management apparatus to a target CDN includes:

if the current CDN includes the at least two serving nodes, and a value of a bandwidth correspondingly connected between the at least two serving nodes in the current CDN is inconsistent with a value of the target bandwidth, adjusting, by the management apparatus according to the change policy, the bandwidth correspondingly connected between the at least two serving nodes in the current CDN to the target bandwidth, where the target transmission path includes the at least two serving nodes.

In this implementation, it is specified that when the target bandwidth correspondingly connected between the at least two serving nodes in the target CDN is inconsistent with a bandwidth in the change policy, the management apparatus adjusts the bandwidth between the two serving nodes, to ensure that the bandwidth between the two serving nodes can meet a user service requirement. Therefore, feasibility of the solution is improved.

According to any one of the first aspect, or the first implementation of the first aspect and the second implementation of the first aspect, in an eighth implementation of the first aspect of this implementation, when the change policy is used to indicate a target function corresponding to a fifth serving node in the target CDN, the changing, by the management apparatus according to the change policy, a current CDN managed by the management apparatus to a target CDN includes:

if the current CDN includes the fifth serving node, and the fifth serving node does not have the target function, adding, by the management apparatus, the target function to the fifth serving node according to the change policy, where the target function includes at least one of the following: converting a coding scheme of data, caching data, and forwarding data, and the target transmission path includes the fifth serving node; or if the current CDN does not include the fifth serving node, after the management apparatus leases the fifth serving node according to the change policy, if the fifth serving node does not have the target function, adding, by the management apparatus, the target function to the fifth serving node, where the target function includes at least one of the following: converting a coding scheme of data, caching data, and forwarding data, and the target transmission path includes the fifth serving node.

In this implementation, a manner of properly adjusting the function of the serving node is specified. When the current CDN includes the fifth serving node, the management apparatus may directly set the function of the fifth serving node according to the change policy. However, when the current CDN does not include the fifth serving node, the management apparatus first adds the fifth serving node according to the change policy, and then sets the function of the fifth serving node according to the change policy. Therefore, feasibility of the solution is improved, and implementation flexibility is enhanced.

According to any one of the first aspect, or the first implementation of the first aspect and the second implementation of the first aspect, in a ninth implementation of the first aspect of this implementation, after the management apparatus determines, based on the service request, a target transmission path of service data corresponding to the service request and a change policy corresponding to the target transmission path, the management apparatus further needs to determine a routing forwarding rule corresponding to the target transmission path, and then set, according to the routing forwarding rule, routing information of the serving nodes corresponding to the target transmission path.

In this implementation, setting of a route in the target CDN by the management apparatus is supplemented. After determining the target transmission path and the change policy corresponding to the target transmission path, the management apparatus may further set the routing forwarding rule, so that service data can be transmitted through the target transmission path. Therefore, feasibility of the solution is improved.

According to any one of the first aspect, or the first implementation of the first aspect and the second implementation of the first aspect, in a tenth implementation of the first aspect of this implementation, the indicating, by the management apparatus, the first serving node to send the service data to the terminal device through the target transmission path includes: indicating, by the management apparatus, the first serving node to send the service data to the second serving node through the target transmission path, so that the second serving node sends the service data to the terminal device, where the second serving node is an edge serving node of the target transmission path.

In this implementation, a manner in which the management apparatus indicates the first serving node to send the service data to the terminal device through the target transmission path is specified. The management apparatus first indicates the first serving node to transmit the service data to the second serving node, and then the service data is transmitted by the second serving node to the terminal device. In this solution, the management apparatus can more flexibly control service data transmission. Therefore, implementation flexibility of the solution is improved.

According to any one of the fifth implementation of the first aspect to the eighth implementation of the first aspect, in an eleventh implementation of the first aspect of this implementation, the management apparatus includes a network functions virtualization NFV orchestrator.

A step in which the management apparatus changes, according to the change policy, the current CDN managed by the management apparatus to the target CDN may be performed by the NFV orchestrator in the management apparatus.

In this implementation, a step in which the NFV orchestrator in the management apparatus changes, according to the change policy, the current CDN managed by the management apparatus to the target CDN is specified, and a specific implementation of changing the current CDN to the target CDN is provided. Therefore, implementability of the solution is improved.

According to the ninth implementation of the first aspect, in a twelfth implementation of the first aspect of this implementation, the management apparatus includes a network orchestrator.

A step in which the management apparatus determines the routing forwarding rule corresponding to the target transmission path, and a step in which the management apparatus set, according to the routing forwarding rule, the routing information of the serving nodes corresponding to the target transmission path may be performed by the network orchestrator in the management apparatus.

In this implementation, it is specified that a network configuration operation after the CDN is changed may be performed by the network orchestrator. This improves feasibility of the solution.

According to a second aspect, an embodiment of this application provides a management apparatus. The apparatus includes:

a receiving module, configured to receive a service request sent by a terminal device;

a first determining module, configured to determine, based on the service request, a target transmission path of service data corresponding to the service request and a change policy corresponding to the target transmission path;

a change module, configured to change, according to the change policy, a current CDN managed by the management apparatus to a target CDN, where the target CDN includes a plurality of serving nodes corresponding to the target transmission path; and a first sending module, configured to send an indication message to a first serving node in the target CDN, to indicate the first serving node to send the service data to the terminal device through the target transmission path, where the first serving node stores the service data;

or a second sending module, configured to send an indication message to a second serving node in the target CDN, to indicate the second serving node to send the service data to the terminal device, where the service data is transmitted to the second serving node through the target transmission path.

In this implementation, after the receiving module in the management apparatus receives the service request sent by the terminal device, the first determining module determines, based on the service request, the target transmission path corresponding to the terminal device, and the change policy required for transmitting data on the target transmission path; and then the change module changes the current CDN, according to the change policy, to obtain the target CDN, where the target CDN includes each serving node corresponding to the target transmission path, so that the service data corresponding to the service request may be returned to the terminal device by using the serving node corresponding to the target transmission path in the target CDN. In other words, in this solution, the CDN may be flexibly deployed based on the service requirement, and the transmission path may be selected without limiting to the existing CDN. Therefore, when network traffic surges, a CDN resource can be flexibly used to expand a network capacity in a relatively short time, to avoid affecting user service experience.

According to the second aspect, in a first implementation of the second aspect of this implementation, the first determining module includes:

a first determining submodule, configured to determine an initial structure parameter, where the structure parameter is used to indicate structure composition of a CDN, and the initial structure parameter is a structure parameter corresponding to the current CDN;

a second determining submodule, configured to determine an initial transmission cost value based on the service request and the initial structure parameter, where the transmission cost value is a minimum cost value required for returning the service data to the terminal device in the CDN indicated by the structure parameter; and an update submodule, configured to update the structure parameter for N times to obtain a target structure parameter, and determine the target transmission path and the change policy based on the target structure parameter, where N is a quantity of update times required for converging the transmission cost value, or a preset maximum quantity of update times, the target transmission path is a transmission path corresponding to a target transmission cost value, the target transmission cost value is a transmission cost value determined based on the target structure parameter, and the change policy includes the target structure parameter or a change operation corresponding to the N times of update.

In this implementation, a manner in which the management apparatus determines, based on the service request, the target transmission path of the service data corresponding to the service request is specified, and a manner in which the management apparatus determines the change policy corresponding to the target transmission path is also specified. In this process, the management apparatus needs to first determine the structure parameter used to indicate the structure composition of the CDN, then determine, by using the structure parameter, the minimum cost value required for returning the service data to the terminal device, further update the structure parameter, and calculate a new transmission cost by using a new structure parameter. The process is repeated for a plurality of times, and the management apparatus can search out, from the entire CDN, at least one target transmission path that is low costly and can meet the service requirement. Because the process of determining the target transmission path and the change policy is a process that requires a large amount of strict calculation, and this calculation process is heuristic to search for the best transmission path, feasibility of the situation can be improved.

According to the second implementation of the first aspect, in a second implementation of the second aspect of this implementation, the structure parameter includes at least one of the following: a quantity of central serving nodes, a quantity of transit serving nodes, a quantity of edge serving nodes, a bandwidth connected between serving nodes, and a service function of a serving node.

In this implementation, content of the structure parameter is specified, and the structure parameter includes at least the quantity of central serving nodes, the quantity of transit serving nodes, the quantity of edge serving nodes, the bandwidth connected between serving nodes, and the service function of the serving node. Therefore, feasibility of the solution is improved.

According to the first implementation of the second aspect or the second implementation of the second aspect, in a third implementation of the second aspect of this implementation, the update submodule includes at least one of the following units:

a node adjusting unit, configured to adjust a quantity and deployment locations of serving nodes, where the serving node includes a central serving node, a transit serving node, or an edge serving node;

a bandwidth adjusting unit, configured to adjust a value of a bandwidth connected between at least two serving nodes; and a function adjusting unit, configured to add at least one of the following service functions for at least one serving node: converting a coding scheme of data, caching data, and forwarding data.

In this implementation, a plurality of manners of updating the structure parameter to obtain the target structure parameter are separately listed, and are respectively changing the quantity and deployment locations of serving nodes, adjusting the bandwidth between serving nodes, and adjusting the function of the serving node. Because one of the plurality of manners may be selected to update the structure parameter, or the plurality of manners may be used to update the structure parameter. Therefore, implementation flexibility of the solution is improved. In addition, different quantities may be set in specific implementation of each manner of updating the structure parameter to obtain the target structure parameter. For example, the serving node is classified into three types: a central serving node, a transit serving node, and an edge serving node. In specific implementation, the three types of serving nodes may be properly combined, to obtain a plurality of different effects of updating the structure parameter. Therefore, the update steps are diversified, and can meet requirements of a large quantity of different users.

According to the first implementation of the second aspect or the second implementation of the second aspect, in a fourth implementation of the second aspect of this implementation, the second determining submodule includes:

a first determining unit, configured to determine a bandwidth requirement corresponding to the service request;

a second determining unit, configured to determine at least one transmission scheme that meets the bandwidth requirement and that is in the CDN indicated by the initial structure parameter;

a third determining unit, configured to determine, based on serving node deployment costs, bandwidth leasing costs, and a network delay, a cost value corresponding to each transmission scheme; and a fourth determining unit, configured to determine a minimum value of the cost value as the initial transmission cost value.

In this implementation, a step in which the management apparatus determines the initial transmission cost value based on the service request and the initial structure parameter is specified. When the management apparatus meets the bandwidth requirement corresponding to the service request of the user, the management apparatus may determine, based on the serving node deployment costs, the bandwidth leasing costs, and the network delay, the cost value of each transmission path, and determine the minimum value of the cost value as the initial transmission cost value. Therefore, feasibility of the solution is improved.

According to any one of the second aspect, or the first implementation of the second aspect and the second implementation of the second aspect, in a fifth implementation of the second aspect of this implementation, the change policy is used to indicate that the target CDN does not include a third serving node and a bandwidth correspondingly connected to the third serving node; and the change module includes:

a node adjusting submodule, configured to: when the current CDN includes the third serving node, suspend, according to the change policy, leasing of the third serving node in the current CDN and the bandwidth correspondingly connected to the third serving node.

In this implementation, a step in which, when the target CDN does not include the third serving node and the bandwidth correspondingly connected to the third serving node, the management apparatus changes the current CDN to the target CDN according to the change policy is specified. Therefore, feasibility of the solution is improved.

According to any one of the second aspect, or the first implementation of the second aspect and the second implementation of the second aspect, in a sixth implementation of the second aspect of this implementation, the change policy is used to indicate that the target CDN includes a fourth serving node and a bandwidth correspondingly connected to the fourth serving node; and the change module includes:

the node adjusting submodule, further configured to: when the current CDN does not include the fourth serving node, lease, according to the change policy, the fourth serving node and the bandwidth correspondingly connected to the fourth serving node, where the target transmission path includes the fourth serving node.

In this implementation, a step in which, when the target CDN includes the fourth serving node and the bandwidth correspondingly connected to the fourth serving node, the management apparatus changes the current CDN to the target CDN according to the change policy is specified. Therefore, feasibility of the solution is improved.

According to any one of the second aspect, or the first implementation of the second aspect and the second implementation of the second aspect, in a seventh implementation of the second aspect of this implementation, the change policy is used to indicate a target bandwidth correspondingly connected between at least two serving nodes in the target CDN; and the change module includes:

a bandwidth adjusting submodule, configured to: when the current CDN includes the at least two serving nodes, and a value of a bandwidth correspondingly connected between the at least two serving nodes in the current CDN is inconsistent with a value of the target bandwidth, adjust, according to the change policy, the bandwidth correspondingly connected between the at least two serving nodes in the current CDN to the target bandwidth, where the target transmission path includes the at least two serving nodes.

In this implementation, it is specified that when the target bandwidth correspondingly connected between the at least two serving nodes in the target CDN is inconsistent with a bandwidth in the change policy, the management apparatus adjusts the bandwidth between the two serving nodes, to ensure that the bandwidth between the two serving nodes can meet a user service requirement. Therefore, feasibility of the solution is improved.

According to any one of the second aspect, or the first implementation of the second aspect and the second implementation of the second aspect, in an eighth implementation of the second aspect of this implementation, the change policy is used to indicate a target function corresponding to a fifth serving node in the target CDN; and the change module includes:

a function adjusting submodule, configured to: when the current CDN includes the fifth serving node, and the fifth serving node does not have the target function, add the target function to the fifth serving node according to the change policy, where the target function includes at least one of the following: converting a coding scheme of data, caching data, and forwarding data, and the target transmission path includes the fifth serving node; or a function adjusting submodule, configured to: when the current CDN does not include the fifth serving node, after the node adjustment submodule leases the fifth serving node according to the change policy, if the fifth serving node does not have the target function, add the target function to the fifth serving node, where the target function includes at least one of the following: converting a coding scheme of data, caching data, and forwarding data, and the target transmission path includes the fifth serving node.

In this implementation, a manner of properly adjusting the function of the serving node is specified. When the current CDN includes the fifth serving node, the management apparatus may directly set the function of the fifth serving node according to the change policy. However, when the current CDN does not include the fifth serving node, the management apparatus first adds the fifth serving node according to the change policy, and then sets the function of the fifth serving node according to the change policy. Therefore, feasibility of the solution is improved, and implementation flexibility is enhanced.

According to any one of the second aspect, or the first implementation of the second aspect and the second implementation of the second aspect, in a ninth implementation of the second aspect of this implementation, the management apparatus further includes:

a second determining module, configured to determine a routing forwarding rule corresponding to the target transmission path; and a route setting module, configured to set, according to the routing forwarding rule, routing information of the serving nodes corresponding to the target transmission path.

In this implementation, setting of a route in the target CDN by the management apparatus is supplemented. After determining the target transmission path and the change policy corresponding to the target transmission path, the management apparatus may further set the routing forwarding rule, so that service data can be transmitted through the target transmission path. Therefore, feasibility of the solution is improved.

According to any one of the second aspect, or the first implementation of the second aspect and the second implementation of the second aspect, in a tenth implementation of the second aspect of this implementation, the first sending module includes:

an indication submodule, configured to indicate the first serving node to send the service data to the second serving node through the target transmission path, so that the second serving node sends the service data to the terminal device, where the second serving node is an edge serving node of the target transmission path.

In this implementation, a manner in which the management apparatus indicates the first serving node to send the service data to the terminal device through the target transmission path is specified. The management apparatus first indicates the first serving node to transmit the service data to the second serving node, and then the service data is transmitted by the second serving node to the terminal device. In this solution, the management apparatus can more flexibly control service data transmission. Therefore, implementation flexibility of the solution is improved.

According to a third aspect, an embodiment of this application provides a management apparatus. The management apparatus performs the method in the first aspect, and the management apparatus includes:

a processor, a memory, a bus, and an input/output device, where the processor, the memory, and the input/output device are connected to the bus;

the input/output device is configured to receive a service request sent by a terminal device;

the memory is configured to store a program; and the processor is configured to execute the program, specifically including the following steps:

determining, based on the service request, a target transmission path of service data corresponding to the service request and a change policy corresponding to the target transmission path; and changing, according to the change policy, a current CDN managed by the management apparatus to a target CDN, where the target CDN includes a plurality of serving nodes corresponding to the target transmission path; and the input/output device is further configured to perform the following steps:

sending an indication message to a first serving node in the target CDN, to indicate the first serving node to send the service data to the terminal device through the target transmission path, where the first serving node stores the service data;

or sending an indication message to a second serving node in the target CDN, to indicate the second serving node to send the service data to the terminal device, where the service data is transmitted to the second serving node through the target transmission path.

In this implementation, after the input/output device in the management apparatus receives the service request sent by the terminal device, the processor in the management apparatus determines, based on the service request, the target transmission path corresponding to the terminal device, and the change policy required for transmitting data on the target transmission path; and changes the current CDN, according to the change policy, to obtain the target CDN, where the target CDN includes each serving node corresponding to the target transmission path, so that the service data corresponding to the service request may be returned to the terminal device by using the serving node corresponding to the target transmission path in the target CDN. In other words, in this solution, the CDN may be flexibly deployed based on the service requirement, and the transmission path may be selected without limiting to the existing CDN. Therefore, when network traffic surges, a CDN resource can be flexibly used to expand a network capacity in a relatively short time, to avoid affecting user service experience.

According to the third aspect, in a first implementation of the third aspect of this implementation, the processor is specifically configured to perform the following steps:

determining an initial structure parameter, where the structure parameter is used to indicate structure composition of a CDN, and the initial structure parameter is a structure parameter corresponding to the current CDN;

determining an initial transmission cost value based on the service request and the initial structure parameter, where the transmission cost value is a minimum cost value required for returning the service data to the terminal device in the CDN indicated by the structure parameter; and updating the structure parameter for N times to obtain a target structure parameter, and determine the target transmission path and the change policy based on the target structure parameter, where N is a quantity of update times required for converging the transmission cost value, or a preset maximum quantity of update times, the target transmission path is a transmission path corresponding to a target transmission cost value, the target transmission cost value is a transmission cost value determined based on the target structure parameter, and the change policy includes the target structure parameter or a change operation corresponding to the N times of update.

In this implementation, a manner in which the processor determines, based on the service request, the target transmission path of the service data corresponding to the service request is specified, and a manner in which the processor determines the change policy corresponding to the target transmission path is also specified. Therefore, feasibility of the solution can be improved.

According to the first implementation of the third aspect, in a second implementation of the third aspect of this implementation, the structure parameter includes at least one of the following: a quantity of central serving nodes, a quantity of transit serving nodes, a quantity of edge serving nodes, a bandwidth connected between serving nodes, and a service function of a serving node.

In this implementation, content of the structure parameter is specified, and the structure parameter includes at least the quantity of central serving nodes, the quantity of transit serving nodes, the quantity of edge serving nodes, the bandwidth connected between serving nodes, and the service function of the serving node. Therefore, feasibility of the solution is improved.

According to the first implementation of the third aspect or the second implementation of the third aspect, in a third implementation of the third aspect of this implementation, the processor is specifically configured to perform at least one of the following steps:

adjusting a quantity and deployment locations of serving nodes, where the serving node includes a central serving node, a transit serving node, or an edge serving node;

adjusting a value of a bandwidth connected between at least two serving nodes; and adding at least one of the following service functions for at least one serving node:

converting a coding scheme of data, caching data, and forwarding data.

In this implementation, a plurality of manners of updating the structure parameter to obtain the target structure parameter are separately listed, and are respectively changing the quantity and the deployment locations of serving nodes, adjusting the bandwidth between serving nodes, and adjusting the function of the serving node. Because one of the plurality of manners may be selected to update the structure parameter, or the plurality of manners may be used to update the structure parameter. Therefore, implementation flexibility of the solution is improved. In addition, different quantities may be set in specific implementation of each manner of updating the structure parameter to obtain the target structure parameter. For example, the serving node is classified into three types: a central serving node, a transit serving node, and an edge serving node. In specific implementation, the three types of serving nodes may be properly combined, to obtain a plurality of different effects of updating the structure parameter. Therefore, the update steps are diversified, and can meet requirements of a large quantity of different users.

According to the first implementation of the third aspect or the second implementation of the third aspect, in a fourth implementation of the third aspect of this implementation, the processor is specifically configured to:

determine a bandwidth requirement corresponding to the service request;

determine at least one transmission scheme that meets the bandwidth requirement and that is in the CDN indicated by the initial structure parameter;

determine, based on serving node deployment costs, bandwidth leasing costs, and a network delay, a cost value corresponding to each transmission scheme; and determine a minimum value of the cost value as the initial transmission cost value.

In this implementation, a step in which the processor determines the initial transmission cost value based on the service request and the initial structure parameter is specified. When the processor meets the bandwidth requirement corresponding to the service request of the user, the processor may determine, based on the serving node deployment costs, the bandwidth leasing costs, and the network delay, the cost value of each transmission path, and determine the minimum value of the cost value as the initial transmission cost value. Therefore, feasibility of the solution is improved.

According to any one of the third aspect, or the first implementation of the third aspect and the second implementation of the third aspect, in a fifth implementation of the third aspect of this implementation, when the change policy is used to indicate that the target CDN does not include a third serving node and a bandwidth correspondingly connected to the third serving node, if the current CDN includes the third serving node, the processor suspends, according to the change policy, leasing of the third serving node in the current CDN and the bandwidth correspondingly connected to the third serving node.

In this implementation, a step in which, when the target CDN does not include the third serving node and the bandwidth correspondingly connected to the third serving node, the processor changes the current CDN to the target CDN according to the change policy is specified. Therefore, feasibility of the solution is improved.

According to any one of the third aspect, or the first implementation of the third aspect and the second implementation of the third aspect, in a sixth implementation of the third aspect of this implementation, when the change policy is used to indicate that the target CDN includes a fourth serving node and a bandwidth correspondingly connected to the fourth serving node, if the current CDN does not include the fourth serving node, the processor leases, according to the change policy, the fourth serving node and the bandwidth correspondingly connected to the fourth serving node, where the target transmission path includes the fourth serving node.

In this implementation, a step in which, when the target CDN includes the fourth serving node and the bandwidth correspondingly connected to the fourth serving node, the processor changes the current CDN to the target CDN according to the change policy is specified. Therefore, feasibility of the solution is improved.

According to any one of the third aspect, or the first implementation of the third aspect and the second implementation of the third aspect, in a seventh implementation of the third aspect of this implementation, when the change policy is used to indicate a target bandwidth correspondingly connected between at least two serving nodes in the target CDN, if the current CDN includes the at least two serving nodes, and a value of a bandwidth correspondingly connected between the at least two serving nodes in the current CDN is inconsistent with a value of the target bandwidth, the processor adjusts, according to the change policy, the bandwidth correspondingly connected between the at least two serving nodes in the current CDN to the target bandwidth, where the target transmission path includes the at least two serving nodes.

In this implementation, it is specified that when the target bandwidth correspondingly connected between the at least two serving nodes in the target CDN is inconsistent with a bandwidth in the change policy, the processor adjusts the bandwidth between the two serving nodes, to ensure that the bandwidth between the two serving nodes can meet a user service requirement. Therefore, feasibility of the solution is improved.

According to any one of the third aspect, or the first implementation of the third aspect and the second implementation of the third aspect, in an eighth implementation of the third aspect of this implementation, when the change policy is used to indicate a target function corresponding to a fifth serving node in the target CDN, if the current CDN includes the fifth serving node, and the fifth serving node does not have the target function, adding, by the processor, the target function to the fifth serving node according to the change policy, where the target function includes at least one of the following: converting a coding scheme of data, caching data, and forwarding data, and the target transmission path includes the fifth serving node; or if the current CDN does not include the fifth serving node, after the processor leases the fifth serving node according to the change policy, if the fifth serving node does not have the target function, the processor adds, the target function to the fifth serving node, where the target function includes at least one of the following: converting a coding scheme of data, caching data, and forwarding data, and the target transmission path includes the fifth serving node.

In this implementation, a manner of properly adjusting the function of the serving node is specified. When the current CDN includes the fifth serving node, the processor may directly set the function of the fifth serving node according to the change policy. However, when the current CDN does not include the fifth serving node, the processor first adds the fifth serving node according to the change policy, and then the processor sets the function of the fifth serving node. Therefore, feasibility of the solution is improved, and implementation flexibility is enhanced.

According to any one of the third aspect, or the first implementation of the third aspect and the second implementation of the third aspect, in a ninth implementation of the third aspect of this implementation, the processor is further configured to perform the following steps:

determining a routing forwarding rule corresponding to the target transmission path; and setting, according to the routing forwarding rule, routing information of the serving nodes corresponding to the target transmission path.

In this implementation, setting of a route in the target CDN by the processor is supplemented. After determining the target transmission path and the change policy corresponding to the target transmission path, the processor may further set the routing forwarding rule, so that service data can be transmitted through the target transmission path. Therefore, feasibility of the solution is improved.

According to any one of the third aspect, or the first implementation of the third aspect and the second implementation of the third aspect, in a tenth implementation of the third aspect of this implementation, the input/output device is specifically configured to perform the following steps:

indicating the first serving node to send the service data to the second serving node through the target transmission path, so that the second serving node sends the service data to the terminal device, where the second serving node is an edge serving node of the target transmission path.

In this implementation, a manner in which the input/output device indicates the first serving node to send the service data to the terminal device through the target transmission path is specified. The input/output device first indicates the first serving node to transmit the service data to the second serving node, and then the service data is transmitted by the second serving node to the terminal device. In this solution, transmission of service data can be more flexibly controlled. Therefore, implementation flexibility of the solution is improved.

According to a fourth aspect, an embodiment of this application provides a CDN management system. The CDN management system includes a management apparatus, a first serving node, and a second serving node, where the management apparatus is connected to the first serving node by using a network, the management apparatus is connected to the second serving node by using a network, and the first serving node is connected to the second serving node by using a link configured by the management apparatus. The first serving node is configured to store service data. The second serving node is configured to send the service data to a terminal device, and the management apparatus is configured to perform the method according to the first aspect.

According to a fifth aspect, an embodiment of this application provides a computer-readable storage medium, including an instruction. When the instruction runs on a computer, the computer is enabled to perform the method according to the first aspect.

According to a sixth aspect, an embodiment of this application provides a computer program product including an instruction. When the instruction runs on a computer, the computer is enabled to perform the method according to the first aspect.

It can be learned from the foregoing technical solutions that the embodiments of this application have the following advantages.

In the embodiments of this application, after receiving the service request sent by the terminal device, the management apparatus determines, based on the service request, the target transmission path corresponding to the terminal device, and the change policy required for transmitting data on the target transmission path; and changes the current CDN, according to the change policy, to obtain the target CDN, where the target CDN includes each serving node corresponding to the target transmission path, so that the service data corresponding to the service request may be returned to the terminal device by using the serving node corresponding to the target transmission path in the target CDN. In other words, in this solution, the CDN may be flexibly deployed based on the service requirement, and the transmission path may be selected without limiting to the existing CDN. Therefore, when network traffic surges, a CDN resource can be flexibly used to expand a network capacity in a relatively short time, to avoid affecting user service experience.

BRIEF DESCRIPTION OF DRAWINGS

To describe the technical solutions in the embodiments of this application more clearly, the following briefly describes the accompanying drawings for describing the embodiments. Apparently, the accompanying drawings in the following description show merely some embodiments of this application.

DESCRIPTION OF EMBODIMENTS

Figure 1:
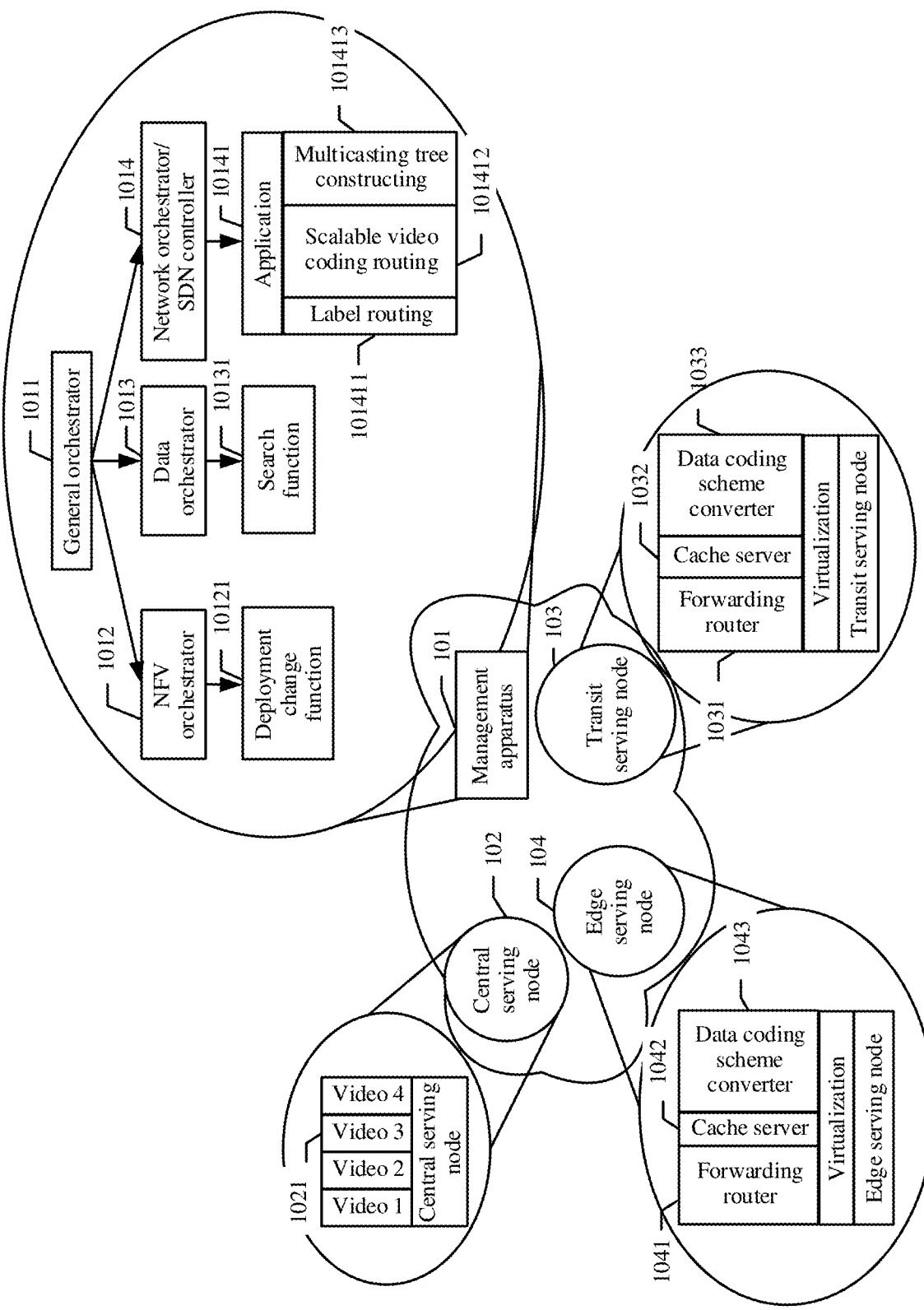
FIG. 1 is a schematic diagram of a network architecture of a data transmission method according to an embodiment of this application.

Embodiments of this application provide a data transmission method and a related apparatus, to flexibly use a CDN resource to expand a network capacity, to avoid affecting user service experience.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The following describes some terms in the embodiments of this application.

Transmission path: A transmission path in this embodiment includes serving nodes through which service data is sent to a terminal device and a connection status of a bottom-layer route between these serving nodes.

Content delivery network (content delivery network, CDN): A content delivery network is a content delivery network constructed on a network. A user obtains required content from the nearest serving node by using functional modules such as load balancing, content delivery, and scheduling on a central platform and by depending on an edge server deployed in each location. This reduces network congestion, and improves a response speed and hit ratio of user access.

Software defined network (software defined network, SDN): A software defined network is a new innovative network architecture, and is an implementation of network virtualization. A control plane and a data plane of a network device may be separated, to implement flexible control of network traffic.

Network function virtualization (network function virtualization, NFV): Network function virtualization means that software is separated from hardware, so that a function of a network device no longer depends on dedicated hardware, but is processed by software that bears a plurality of functions by using universal hardware and a virtualization technology. Therefore, the network device function may be virtualized to implement a virtualized network function (virtualized network function, VNF), and develops towards a direction that is based on a universal hardware platform, so that resources can be fully and flexibly shared, and minute-level automatic deployment, elastic scaling, fault isolation, self-healing, and the like can be performed based on an actual service requirement.

Internet protocol (internet protocol, IP): An internet protocol is a protocol designed for interconnection and communication between computer networks. The protocol enables all computer networks connected to the internet to implement a set of rules of communicating with each other, and defines a rule with which a computer needs to comply when communicating on the internet.

Scalable video coding (scalable video coding, SVC): Scalable video coding is a video coding technology, and the technology may encode a video signal into a form of layers. When a bandwidth is insufficient, only a bitstream at a basic layer is transmitted and decoded, but video decoding quality is not high in this case. When the bandwidth increases gradually, a bitstream at an enhancement layer may be transmitted and decoded to improve video decoding quality. Scalable high efficient video coding (scalable high efficiency video coding, SHVC): Scalable high efficient video coding is a next-generation SVC that has better encoding and decoding performance and can meet requirements of more application scenarios.

The following describes a system architecture to which the embodiments of this application are applicable.

The method provided in the embodiments of this application is mainly applied to a scenario in which service data is transmitted to a user by using a CDN. For example, when the user needs a live broadcast service, the CDN is required to quickly transmit service data of the live broadcast service to the user, and higher picture quality and a lower network delay need to be ensured. In addition, service data also needs to be transmitted by using a CDN in a similar scenario such as the internet of vehicles or the internet of things. It should be noted that the method provided in this embodiment of this application may be applied to a scenario in which heavy-traffic service data needs to be transmitted, or may be applied to an application scenario with a relatively high network delay requirement, or may be applied to another scenario in which a CDN service is processed. This is not specifically limited herein. Based on the application scenario of the CDN, a network structure provided in an embodiment of this application is shown in FIG. 1. A system of the CDN mainly includes a management apparatus and a serving node. The management apparatus 101 is also referred to as a management system (management system), and executes a management task for the CDN, including topology structure management, data management, and network management. The topology structure management refers to managing a quantity of serving nodes, placing locations of serving nodes, a bandwidth connection between a plurality of serving nodes, or a function of a serving node in the CDN. The data management refers to querying a storage location of service data and classifying the data. The network management refers to managing route forwarding, a routing rule, and the like in the CDN.

It should be understood that the management apparatus needs to cooperate with one or more orchestrators to execute these management tasks. The orchestrator includes a general orchestrator (orchestrator) 1011, an NFV orchestrator (network function virtualization orchestrator, NFV-ORCH) 1012, and a data orchestrator (data orchestrator, DATA-ORCH) 1013, and a network orchestrator (network orchestrator, NETWORK-ORCH) 1014. The general orchestrator is a component connected to other sub-orchestrators (an NFV orchestrator, a data orchestrator, and a network orchestrator), and a task is to ensure communication between the sub-orchestrators. The NFV orchestrator may change a topology structure of the CDN (adding/deleting a node or a channel, changing a channel bandwidth, or the like). Specifically, the NFV orchestrator includes a deployment change function 10121, and may determine, by using an appropriate algorithm, a transmission path on which service data is transmitted, and a change operation that should be performed by a CDN corresponding to the transmission path, to prepare for subsequent service processing. The data orchestrator has a search function 10131, and may monitor and sense storage locations of all service data in the entire CDN, and perform data management on the service data. The network orchestrator, also referred to as an SDN controller, is mainly responsible for network management, and is responsible for managing data transmission of the CDN, to achieve an objective of managing data transmission of the CDN by controlling to run applications such as label routing (label routing) 101411, SVC/SHVC routing (SVC/SHVC routing) 101412, or multicasting (multicasting) tree constructing 101413.

In addition, the serving node in the network architecture includes three types: a central serving node 102, a transit serving node 103, and an edge serving node 104. The three types of serving nodes are connected to each other under a command of the management apparatus to complete service data transmission. All the foregoing serving nodes may use an NFV technology to bear a VNF related to content delivery.

The central serving node (origin server) is mainly responsible for storing a video 1021 in an SVC/SHVC format. In addition to a function of a conventional serving node, the edge serving node (edge server) and the transit serving node (intermediate server) further use an NFV technology to generate a VNF device by using a basic capability for providing a VNF by an underlying data center. The VNF device includes at least a cache (cache) server 1032/1042, an SVC/SHVC converter (SVC/SHVC switch) 1033/1043, and a forwarding router (switch) 1031/1041. It should be noted that a primary function in functions of these serving nodes is a cache function. In other words, a current optimal cache deployment solution may be calculated in real time based on types of different services, a quantity of served users, geographical location distribution of the users, and the like on each edge serving node. Further, the current optimal cache deployment solution may be applied in real time in a running process, to dynamically increase or decrease a cache capacity. In addition, the SVC/SHVC converter may convert an SVC/SHVC video stream from original high quality to lower quality based on a user request. It should be understood that transit serving node and the edge serving node may also implement a plurality of other functions, for example, functions such as load balancing, firewall, and intrusion detection, through virtualization of the basic capability of the VNF.

In addition to the system architecture shown in FIG. 1, the data transmission method in this embodiment may be applicable to another system architecture. This is not specifically limited herein.

Figure 2:
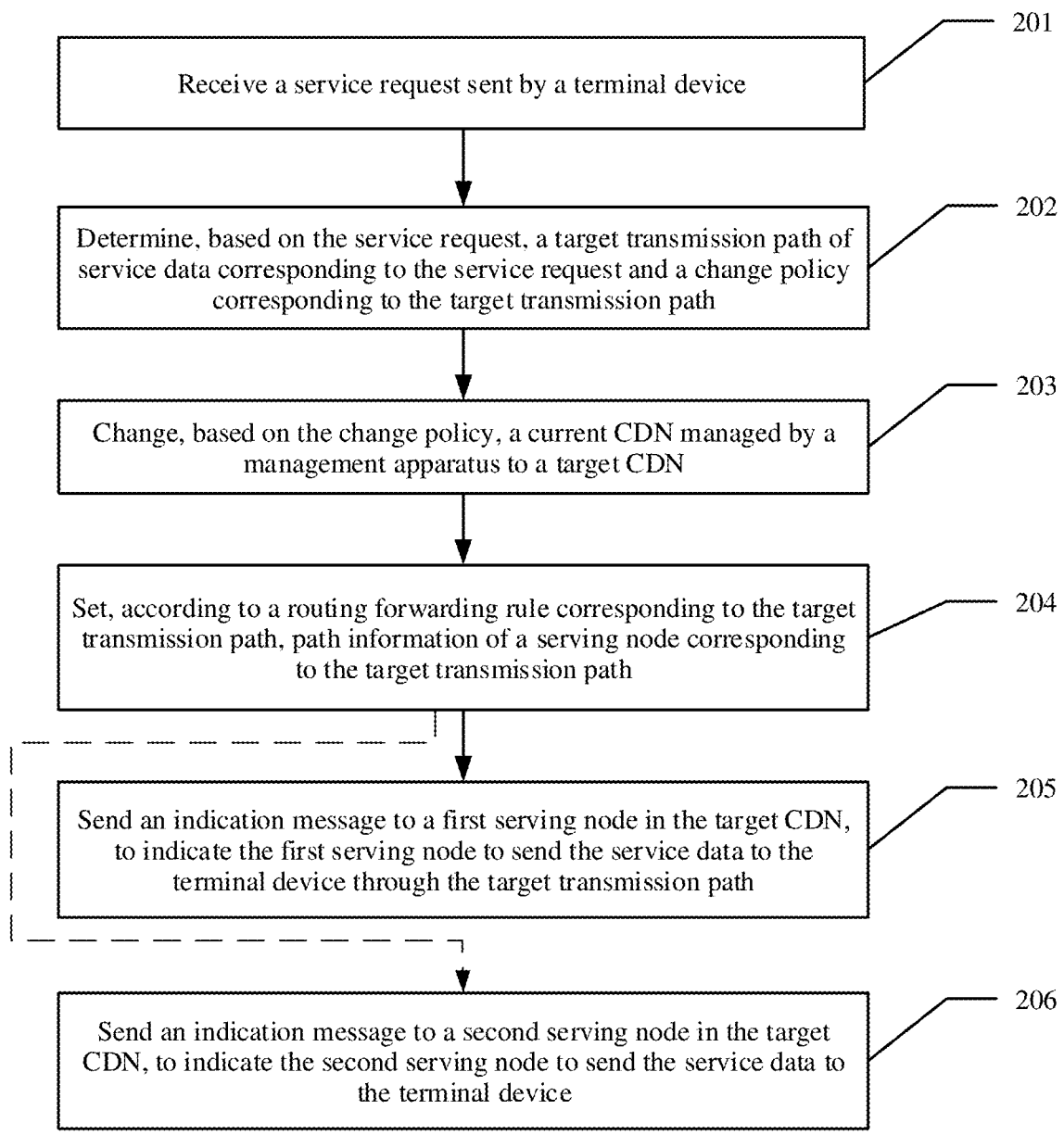
FIG. 2 is a flowchart of a data transmission method according to an embodiment of this application.

To better understand the solution provided in this embodiment of this application, the following describes a specific procedure in this embodiment. FIG. 2 shows a data transmission method provided in this embodiment. A management apparatus in the method performs the following steps.

201: The management apparatus receives a service request sent by a terminal device.

When executing a daily management task, the management apparatus monitors a status of users of an entire CDN, mainly including: a quantity of users connected to each edge serving node, service types requested by these users by using the serving node, and a bandwidth that needs to be occupied. Therefore, when a user initiates a service request to the CDN by using the terminal device, the management apparatus may directly or indirectly receive the service request sent by the terminal device. Specifically, the service request may be directly sent by the terminal device to the management apparatus, or the terminal device may select a specific edge serving node and initiate the service request to the serving node, and then the edge serving node directly forwards the service request to the management apparatus. This is not specifically limited herein. It should be noted that, in this embodiment, there may be one or more terminal devices that initiate the service request. In other words, the management apparatus may receive a service request sent by one or more terminal devices, and the service request initiated by the plurality of users may be a request for same service data, or a request for one type of service data. For example, the plurality of users may simultaneously request a video of a World Cup final, or the plurality of users may all request a video of a sports type, but not all of the plurality users request a video of a football match.

In addition, it should be further understood that the management apparatus may perform statistical analysis at intervals of a period of time, to determine that which service data that is requested by which serving node is relatively large, and then determine, based on this case, whether a current CDN needs to be adjusted. Certainly, it is obvious that the time period mentioned herein may be determined by the management apparatus, and may be a time period from a current moment to one or two hours in the future. For example, during a World Cup match, a large quantity of users request a video of the match in a centralized time period, in this case the CDN needs to detect, every several minutes or even every one minute, whether the current CDN can smoothly provide a live broadcast service requirement of the match for the plurality of users, and whether the current CDN needs to be changed, to better meet user service experience. After the live broadcast ends, only a few users may watch a replayed video of the match. In this case, the CDN may no longer need to frequently detect whether the current CDN can smoothly provide service data for a large quantity of users.

202: The management apparatus determines, based on the service request, a target transmission path of service data corresponding to the service request and a change policy corresponding to the target transmission path.

In this embodiment, after the management apparatus receives the service request sent by the terminal device, the management apparatus determines the target transmission path of the service data corresponding to the service request, and the change policy corresponding to the target transmission path. In this embodiment, the target transmission path refers to a path formed by serving nodes through which the service data is returned to all the terminal devices that send the service request and a bottom-layer route between these serving nodes. Specifically, the target transmission path may be one transmission path, or may be a combination of a plurality of transmission paths. For example, the management apparatus receives service requests sent by a first terminal device and a second terminal device, a transmission path on which the service data is returned to the first terminal device is A-B1-C2-D (path 1), and a transmission path on which the service data is returned to the second terminal device is A-B2-C3-E (path 2). In this case, the target transmission path is a combination of the path 1 and the path 2. It should be noted that the target transmission path includes a bottom-layer route between every two serving nodes. In other words, a route for transmitting service data between every two serving nodes may be selected.

It should be noted that selection of the target transmission path in this embodiment is not limited to the current CDN. In other words, the current CDN does not match the target transmission path. For example, the target transmission path may include a serving node that does not exist in the current CDN, a service function corresponding to a specific node in the target transmission path is inconsistent with that of the serving node in the current CDN, and the like. The change policy is used to indicate the management apparatus to change the current CDN to a target CDN that can match the target transmission path. For example, if the target transmission path includes the serving node that does not exist in the current CDN, the change policy includes information used to indicate the management apparatus to add the serving node based on the current CDN.

Specifically, the management apparatus may determine, in the following manner, the target transmission path and the change policy corresponding to the target transmission path.

S1: The management apparatus determines an initial structure parameter.

In this embodiment, the management apparatus may first determine the initial structure parameter of the CDN, to prepare for execution of a subsequent step. The structure parameter is used to indicate structure composition of the CDN, for example, a quantity of central serving nodes, a quantity of transit serving nodes, or a quantity of edge serving nodes in the CDN, deployment locations of these serving nodes, a bandwidth correspondingly connected between a plurality of serving nodes, and a service function of a serving node. Further, the initial structure parameter refers to a structure parameter corresponding to the current CDN. Therefore, it may be understood that, after the management apparatus determines the initial structure parameter, the management apparatus specifies serving nodes in the current CDN, locations respectively of these serving nodes, and how to connect between these serving nodes.

It should be understood that the initial structure parameter actually represents a status of the current CDN. For example, because the management apparatus may monitor an outflow status of each serving node in real time, in the current CDN, traffic of service data transmitted between some serving nodes is relatively large, so that an obvious network delay occurs during service data transmission, and some other serving nodes are in an idle state, and cannot help the other serving nodes share a data processing task to balance data processing load of the entire CDN. Therefore, in this case, the management apparatus may specify that the current CDN needs to be changed. However, it should be noted that, after receiving the service request of the user, the management apparatus may predetermine, based on a quantity of users accessing the current CDN, whether the current CDN needs to be changed, and then obtain, through calculation, the target transmission path and the change policy corresponding to the target transmission path. Certainly, the management apparatus may also directly determine, by using a calculation result, whether to perform changing. This is not specifically limited herein.

S2: The management apparatus determines an initial transmission cost value based on the service request and the initial structure parameter.

In this embodiment, after determining the initial structure parameter, the management apparatus may determine the initial transmission cost value through calculation, and the transmission cost value is a minimum cost value required for returning the service data to the terminal device in the CDN indicated by the structure parameter.

Specifically, the management apparatus may first determine a bandwidth requirement corresponding to the service request, then determine at least one transmission scheme that meets the bandwidth requirement and that is in the CDN (namely, the current CDN) indicated by the initial structure parameter, then determine, based on node deployment costs, bandwidth leasing costs, and a network delay, a cost value corresponding to each transmission scheme, and finally determine a minimum value of the cost value as the initial transmission cost value. In this embodiment, the management apparatus determines the bandwidth requirement corresponding to the service request, and the bandwidth requirement refers to a bandwidth required for transmitting the service data. In addition, the management apparatus further monitors a bandwidth occupied by service data being processed by all edge serving nodes, to ensure that service data processed by each edge serving node does not exceed a maximum bandwidth of the edge serving node. It may also be understood that the management apparatus monitors all edge serving nodes in real time, to avoid a network delay caused by overload of each serving node. Therefore pixelation or audio discontinuity in a video is avoided. It should be further noted that the management apparatus further monitors a status of service data cached by each serving node, for example, which data is cached by which serving node, and how much memory is occupied by the data.

It should be noted that, in this embodiment, the transmission scheme refers to a transmission path used to return the service data to the terminal device that sends the service request. For example, the terminal device that sends the service request includes the first terminal device and the second terminal device. On a premise that the bandwidth requirement is met, the service data may be returned to the first terminal device by using the path A-B1-C2-D, and the service data may be returned to the second terminal device by using a path A-B2-C1-E. Alternatively, the service data may be returned to the first terminal device by using the path A-B3-C3-D, and the service data may be returned to the second terminal device by using a path A-B2-C3-E. In this case, the path combination A-B1-C2-D and the path combination A-B2-C1-E form a transmission scheme, and the path combination A-B3-C3-D and the path combination A-B2-C3-E form a transmission scheme.

In addition, the management apparatus may determine a delay requirement of the service by using the service request. Specifically, for example, for a live broadcast service, the service is relatively sensitive to a delay. In other words, if a delay of the service is relatively high, pixelation or audio discontinuity may occur in a video. This affects user service experience. Therefore, for some delay-sensitive services such as the live broadcast service, meeting a delay requirement may be more important than reducing a bandwidth leasing cost. Therefore, when receiving a service request of a user, the management apparatus may first determine whether the service is a delay-sensitive service. If it is determined that the service is the delay-sensitive service, when a transmission scheme is determined by subsequently updating a structure parameter, a delay requirement may be preferentially met, and then bandwidth leasing costs and node deployment costs are considered. For example, if a delay requirement of a specific service is that a delay cannot exceed 50, the management apparatus may first ensure that the delay does not exceed 50, then consider how to meet a bandwidth requirement, and then modify a structure parameter to determine a transmission scheme on a premise that the delay condition and the bandwidth requirement are met.

It should be noted that the transmission cost value does not represent costs required for transmitting the service data to the terminal device by using one or more transmission paths, but represent a score obtained by calculating the node deployment costs, the bandwidth leasing costs, and the network delay according to a certain proportion distribution weight. In other words, the cost value can be an indicator used to evaluate advantages and disadvantages of the transmission scheme to a certain extent. In this embodiment, an evaluation rule of the cost value is that a lower cost value indicates lower costs and a lower network delay consumed by a transmission scheme corresponding to the cost value. Therefore, the lower cost value indicates a better transmission scheme corresponding to the cost value. Certainly, the transmission scheme in the CDN is evaluated not only by using the score of the cost value, but also by using another less important evaluation item, for example, a type of the service data, and whether a network signal at a current moment at a location of the user is better. However, the cost value at least combines a plurality of major factors, and digitizes these factors to quickly distinguish advantages and disadvantages of different transmission schemes in a form of digital calculation. Specifically, the management apparatus may calculate a cost value S of a specific transmission scheme by using the following formula: $S=M\times\alpha+N\times\beta+L\times\delta$, where M is a total cost value of a serving node that needs to be deployed in the transmission scheme, a is a preset weighting coefficient of deployment costs, N is a total cost value of a bandwidth that needs to be leased in the transmission scheme, $\beta$ is a preset weighting coefficient corresponding to leasing costs, L is a network delay corresponding to the transmission scheme, and $\delta$ is a preset weighting coefficient corresponding to a network delay.

It should be understood that, in this embodiment, the total cost value of the serving node that needs to be deployed in the transmission scheme, which is referred to as node deployment costs for short below, refers to leasing costs of all the serving nodes that need to be deployed in the transmission scheme. Certainly, in a same transmission scheme, when service data is transmitted to two different terminal devices by respectively using two cross transmission paths, leasing costs are calculated only once on a serving node at a cross point. It should be noted that, to configure a function for the serving node, the management apparatus may need to lease a serving node with a more powerful function at an additional cost. Therefore, an operation of configuring the function for the serving node also affects node deployment costs. Therefore, it is easy to understand that leasing costs of each serving node may be different due to factors such as different distribution locations and different function configurations of the serving node. However, these costs are negotiated with an operator in advance. When calculating the cost value, the management apparatus may directly obtain related information about the costs and calculate the cost value.

Similarly, the total cost value of the bandwidth that needs to be leased in the transmission scheme, which is referred to as bandwidth leasing costs for short below, refers to a sum of leasing costs of a bandwidth connected between every two serving nodes in the transmission scheme. A value of the bandwidth connected between every two serving nodes differs, and corresponding leasing costs may also be different. It should be noted that every two serving nodes are connected by a plurality of segments of routes sent by a plurality of routers. The management apparatus may fine-tune an amount of data forwarded by each router, and to which each router can forward data. To ensure that the maximum bandwidth is not exceeded, every two serving nodes are connected by using the plurality of segments of routes. Therefore, a sum of bandwidth leasing costs of the plurality of segments of routes is the bandwidth leasing costs. For example, it is assumed that there are five segments of routes between a serving node A and a serving node B, and a cost of each segment is 1, bandwidth leasing costs between the serving node A and the serving node B are 5. However, these costs are also negotiated with an operator in advance. When calculating the cost value, the management apparatus may directly obtain related information about the costs and calculate the cost value.

In addition, the delay mentioned in this embodiment refers to a time required for transmitting a packet or a packet group from one end to another end of a network, and the delay includes a sending delay, a propagation delay, a processing delay, and a queuing delay. The delay in this embodiment is mainly the propagation delay and the queuing delay. The propagation delay is an inherent attribute of the network and is related to a distance, and the queuing delay is caused by network congestion. Different services have different delay requirements. For example, an on-demand service is insensitive to a delay, so that a path with a high delay may be selected, and a live service is sensitive to a delay, so that a path with a low delay may be selected. Because the management apparatus may detect a network congestion status and make a corresponding adjustment, in this embodiment, the network delay corresponding to the transmission scheme, which referred to as a network delay for short below, is a sum of delays between every two serving nodes. For example, if the path combination A-B2-C1-E and a path combination A-B2-C2-D1 form a transmission scheme, and the three transmission paths simultaneously send service data from the serving node A to edge serving nodes respectively corresponding to the three paths, a delay of the transmission scheme is a sum of delays of A-B2, B2-C1, C1-E, B2-C2, and C2-D1 segments. Certainly, factors that affect the network delay vary with different network statuses. This is not specifically limited herein.

In this embodiment, the management apparatus may determine cost values of all transmission paths based on the node deployment costs, the bandwidth leasing costs, and the network delay by using a plurality of different calculation methods. For ease of understanding, this embodiment is described by using FIG. 3 as an example. A in the figure is a serving node that stores service data, E is an edge serving node that may directly forward data to a terminal device 1, D3 is also an edge serving node that may directly forward data to a terminal device 2, and the remaining serving node may be a transit serving node or an edge serving node. For ease of calculation, it is assumed herein that all serving nodes except A, E, and D3 are transit serving nodes. In addition, "(8, 80, 10)" in the figure indicates that costs of leasing a bandwidth connected between two serving nodes A and B2 is 8, a value of a bandwidth connected between the two serving nodes A and B1 is 80, and a delay between the serving node A and a serving node B is 10. It should be noted that the serving node A is the serving node that stores the service data, and the serving node is always in a use state and does not need to be leased.

Figure 3:
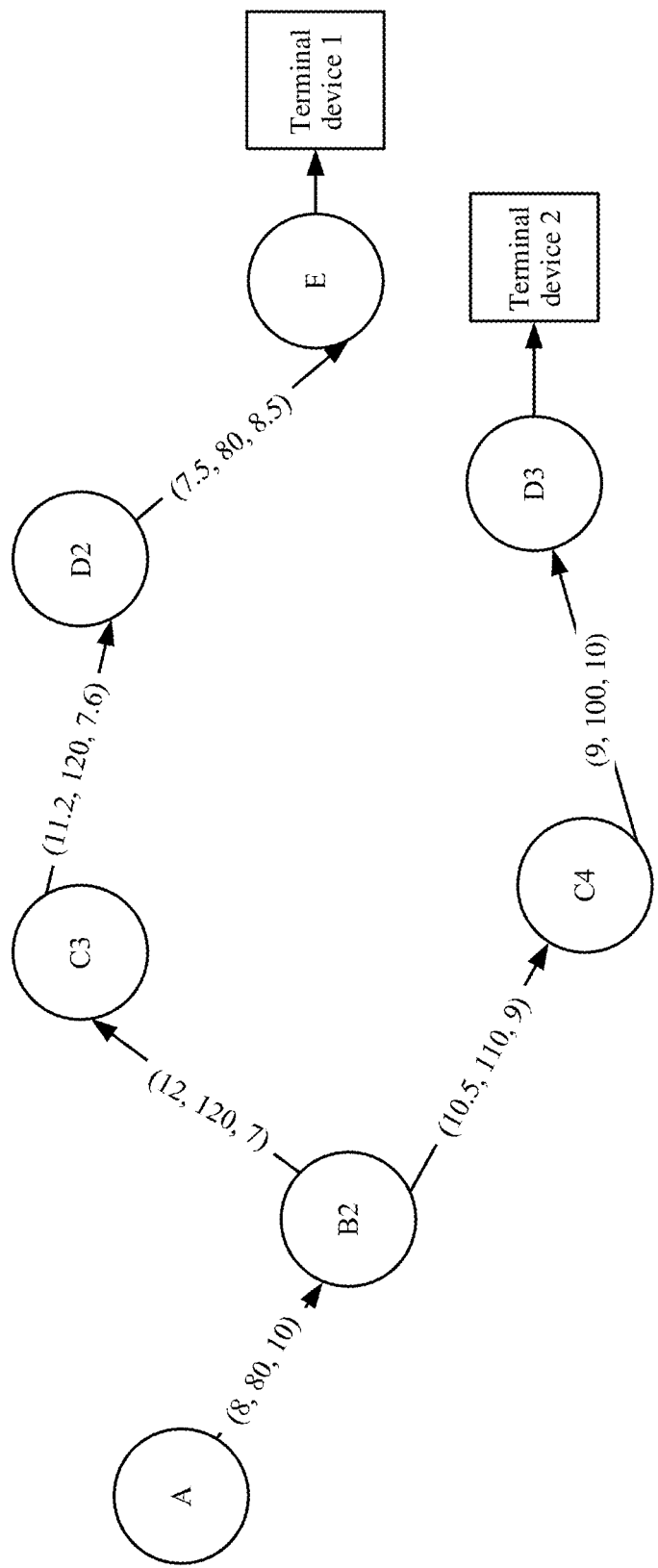
FIG. 3 is a schematic diagram of an embodiment of a data transmission method according to an embodiment of this application.

In this embodiment, as shown in FIG. 3, it is assumed that two types of users request the service data. For service data requested by the terminal device 1, the management apparatus indicates the serving node A to transmit the service data to the edge serving node E by using the serving node B2, a serving node C3, and a serving node D2, and then the edge serving node E sends the service data to the terminal device 1. For service data requested by the terminal device 2, the management apparatus indicates the serving node A to transmit the service data to the edge serving node D3 by using a serving node B2 and a serving node C4, and then the edge serving node D3 sends the service data to the terminal device 2. Because the node deployment costs refer to leasing costs of all serving nodes that need to be deployed in the transmission scheme, for the example shown in FIG. 3, the node deployment costs include a sum of leasing costs of the serving node A, the serving node B2, the serving node C3, the serving node D2, and the serving node E, the serving node C4, and the serving node D3, and leasing costs of each serving node is shown in Table 1. Deployment costs of the node are calculated as follows: 17+11+7+6+14+9=64. In addition, the bandwidth leasing costs refer to a sum of leasing costs of bandwidths connected between every two serving nodes in the transmission scheme. For the example shown in FIG. 3, the bandwidth leasing costs is a sum of bandwidth leasing costs between the serving node A and the serving node B2, between the serving node B2 and the serving node C3, between the serving node C3 and the serving node D2, between the serving node D2 and the serving node E, between the serving node B2 and the serving node C4, and between the serving node C4 and the serving node D3. The bandwidth leasing costs are calculated as follows: 8+12+11.2+7.5+10.5+9=49.2. In addition, for the example shown in FIG. 3, a network delay of the transmission scheme is: 10+7+7.6+8.5+9+10=52.1.

In this embodiment, the weighting coefficient is set to reflect importance of the three evaluation elements: the node deployment costs, the bandwidth leasing costs, and the network delay in an entire element system. Therefore, neither of the weighting coefficient corresponding to the node deployment costs, the weighting coefficient corresponding to the bandwidth leasing costs, and the weighting coefficient corresponding to the network delay is fixed. This embodiment is described by using only an example in which a proportion of the weighting coefficients is 0.45:0.35:0.2. In this embodiment, a cost value of the transmission scheme shown in FIG. 3 is calculated to be: 64×0.45+49.2×0.35+52.1×0.2=56.44 by using the proportion of the weighting coefficients being 0.45:0.35:0.2.

Further, the management apparatus may use the foregoing calculation method to determine a transmission scheme with a minimum cost value in the current CDN. Therefore, for ease of further explanation, this embodiment is described by using an example in which the transmission scheme with the minimum cost value obtained through calculation in the current CDN is the transmission scheme shown in FIG. 3. Therefore, the initial transmission cost value is determined as 64×0.45+49.2×0.35+52.1×0.2=56.44 based on the initial structure parameter.

TABLE 1

| Sequence number of a serving node | Leasing costs |
|---|---|
| A | 0 |
| B1/B2 | 18/17 |
| C1/C2/C3/C4 | 12/13/11/14 |

TABLE 1-continued

| Sequence number of a serving node | Leasing costs |
|---|---|
| D1/D2/D3 | 8/7/9 |
| E | 6 |
| F | 10 |

In some embodiments, the service data requested by the user may be stored in one or more central serving nodes. In this case, the management apparatus calculates the transmission cost value based on the initial structure parameter, and determines one or more central serving nodes from which the service data starts to be transmitted. In addition, if a user has requested the service data before and the service data is successfully received from a specific edge serving node, at least one edge serving node exists in the current CDN, and the edge serving node stores the service data. In this case, the management apparatus considers, during calculation, whether the service data can be transmitted from the edge serving node to a terminal device that requests the service data by using a specific transmission path. If possible, the management apparatus calculates the initial cost value by using the foregoing calculation manner.

S3: The management apparatus updates the structure parameter for N times to obtain a target structure parameter, and determines the target transmission path and the change policy based on the target structure parameter.

In this embodiment, after the management apparatus determines the initial transmission cost value based on the service request and the initial structure parameter, the management apparatus updates the structure parameter for N times to obtain the target structure parameter, and determines the target transmission path and the change policy based on the target structure parameter. N is a quantity of update times required for converging the transmission cost value, or a preset maximum quantity of update times. The target transmission path is a transmission path corresponding to a target transmission cost value, the target transmission cost value is a transmission cost value determined based on the target structure parameter, and the change policy includes the target structure parameter or a change operation corresponding to the N times of update.

More specifically, in this embodiment, it is assumed that the initial transmission cost value determined by using the initial structure parameter is a0. The management apparatus updates the structure parameter for the first time to obtain a CDN 1, then calculates a transmission scheme in which the CDN 1 meets a bandwidth requirement, and calculates a cost value corresponding to each transmission scheme. The smallest cost value is a transmission cost value a1 corresponding to the CDN 1. Then, the management apparatus compares a1 with a0. If a1 is less than a0, this update is valid, and the management apparatus performs a second update based on a structure parameter obtained after the first update, to obtain a CDN 2. If a1 is greater than or equal to a0, the management apparatus may perform a second update on the initial structure parameter to obtain a CDN 2, or may perform a second update on a structure parameter obtained after the first update, to obtain a CDN 2. This is not specifically limited herein. However, it should be noted that, when an amplitude of a1 greater than a0 does not exceed a tolerance, the management apparatus also performs the second update based on the structure parameter obtained after the first update. The tolerance refers to an acceptability of a difference in a target implementation process. For example, if a1=90, a0=80, the tolerance is: a0×20%=80×

20%=16. Apparently, 90−80=10<16, and therefore the management apparatus also performs the second update based on the structure parameter obtained after the first time update. Similarly, the management apparatus may obtain a plurality of transmission cost values a2, a3, a4, . . . , and an through a plurality of times of updating and calculation cycles. When a sequence of a2, a3, a4, . . . , and an converges, or when a quantity of update times n is equal to a preset maximum quantity of update times, the management apparatus stops updating the structure parameter. In this case, a structure parameter corresponding to the cost value an of a CDN n is the target structure parameter.

Each update operation may be at least one of the following operations:

(1) The management apparatus adjusts a quantity and deployment locations of serving nodes, where the serving node includes a central serving node, a transit serving node, or an edge serving node.

(2) The management apparatus adjusts a bandwidth connected between at least two nodes.

(3) The management apparatus adds at least one of the following service functions for at least one node: converting a coding scheme of data, caching data, and forwarding data.

It should be noted that, in this embodiment, the management apparatus may adjust a quantity of serving nodes by adding one serving node or reducing one serving node. Certainly, the management apparatus may also reduce one serving node at a first location, and then add one serving node at a second location to adjust the deployment locations of the serving nodes. In addition, if the transit serving node is added, the service data may be backed up and locally cached in the transit serving node if the service data is transmitted to the transit serving node, so that when a user requests the data next time, the management apparatus directly indicates the transit serving node to transmit the serving data to the terminal device.

Figure 4A:
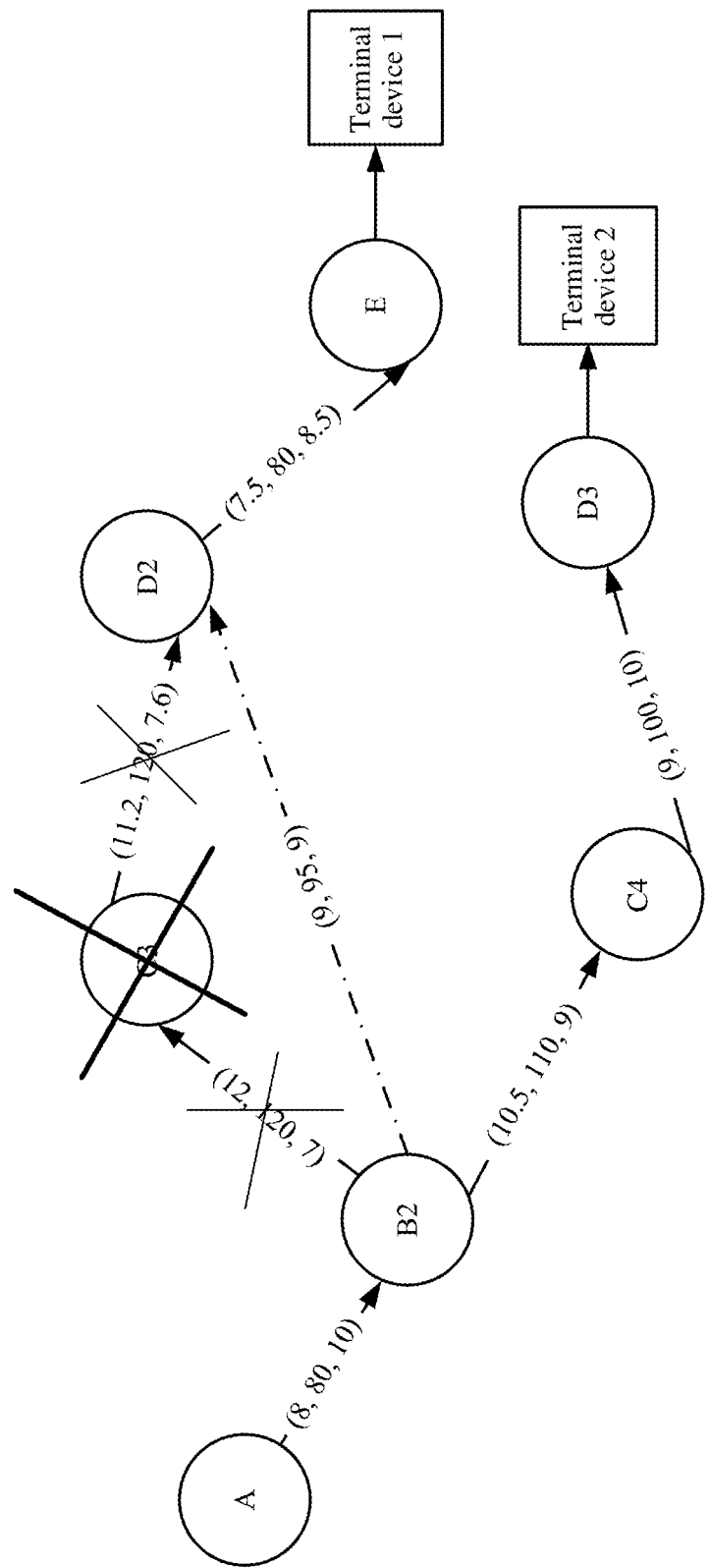
FIG. 4A is a schematic diagram of another embodiment of a data transmission method according to an embodiment of this application.

For ease of understanding, in this embodiment, FIG. 4A is used as an example to describe a possible change operation. In step S2, it is calculated that when two types of users request the service data, the transmission scheme with the minimum cost value in the current CDN is the transmission scheme shown in FIG. 3, and the initial transmission cost value corresponding to the transmission scheme is: a0=56.44. In this case, the management apparatus needs to adjust a structure parameter in the current CDN. As shown in FIG. 4A, a cross on the serving node C3 indicates that the management apparatus deletes the serving node C3. Then, after the changed serving node is determined, the management apparatus further adjusts the bandwidth between every two serving nodes. Similarly, a cross on a bandwidth "(12, 120, 7)" between the serving node B2 and the serving node C3 indicates that a bandwidth "B2-C3-(12, 120, 7)" is deleted. Similarly, a cross on a bandwidth "(11.2, 120, 7.6)" between the serving node C3 and the serving node D2 indicates that a bandwidth "C3-D2-(11.2, 120, 7.6)" is deleted. Then, a dashed arrow between the serving node B2 and the serving node D2 represents an added bandwidth "B2-D2-(9, 95, 9)" between B2 and D2. Then, a cost value of the transmission path in this case is calculated, where node deployment costs are: 17+7+6+14+9=53, bandwidth leasing costs are: 8+9+7.5+10.5+9=44, and a network delay is: 10+9+10+9+8.5=46.5. Then, a cost value calculated by using the weighting coefficient with the proportion of 0.45: 0.35:0.2 is: a1=53×0.45+44×0.35+46.5×0.2=48.55. Apparently, a1 is less than a0, this update is valid, and the management apparatus performs a second update based on FIG. 4A.

Figure 4B:
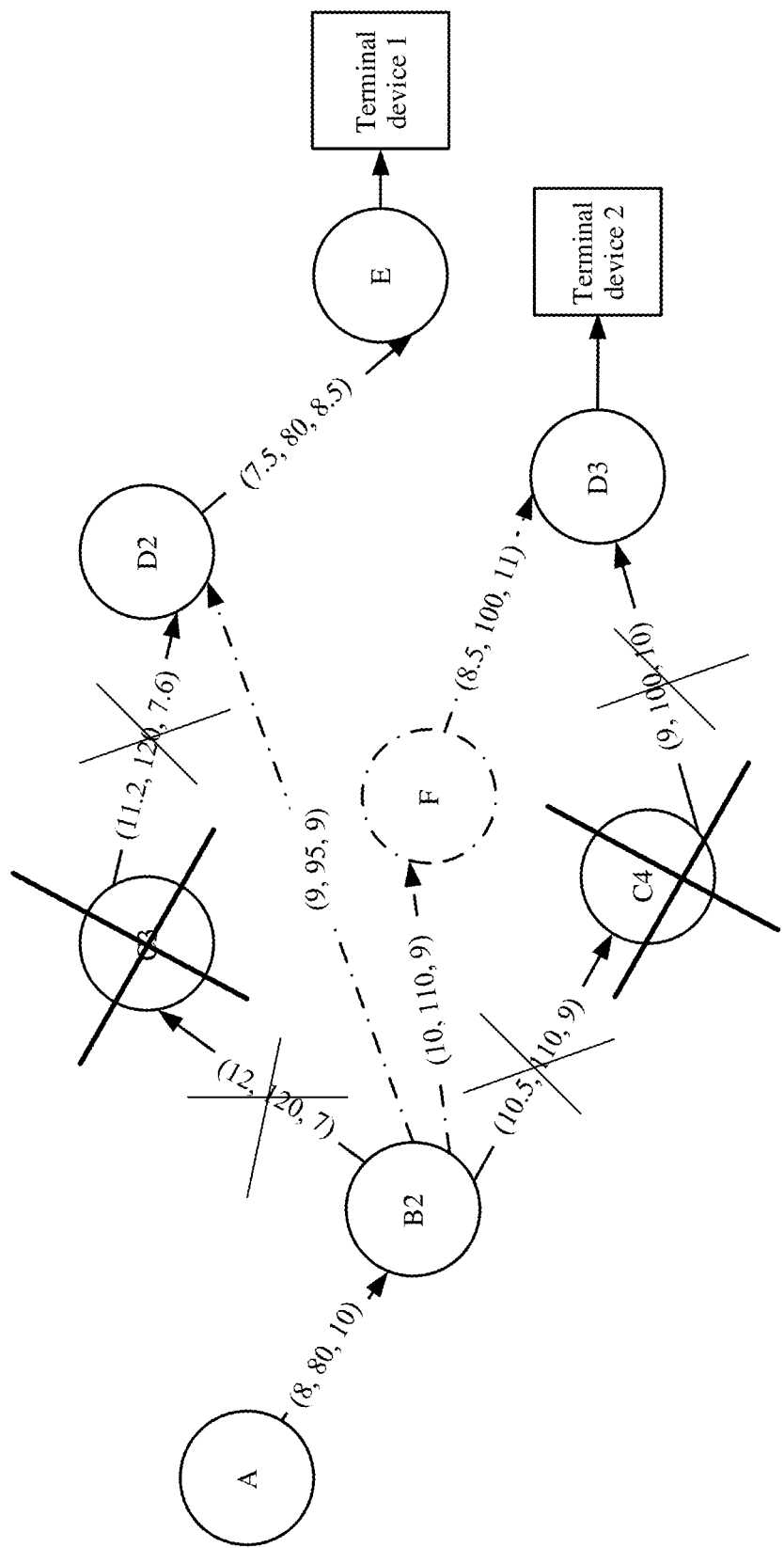
FIG. 4B is a schematic diagram of another embodiment of a data transmission method according to an embodiment of this application.

It is assumed that the second update is shown in FIG. 4B. The management apparatus deletes the serving node C4, and adds a serving node F. Then, after the changed serving node is determined, the management apparatus deletes bandwidths "B2-C4-(10.5, 110, 9)" and "C4-D3-(9, 100, 10)" that are connected to C4, and then adds a bandwidth "B2-F-(10, 110, 9)" between B2 and F and a bandwidth "F-D3-(8.5, 100, 11)" between F and D3, to obtain a transmission path shown in FIG. 4B. Then, a cost value of the transmission path in this case is calculated, where node deployment costs are: 17+7+6+10+9=49, bandwidth leasing costs are: 8+9+7.5+10.5+8.5=43, and a network delay is: 10+9+11+9+8.5=47.5. Then, a cost value calculated by using the weighting coefficient with the proportion of 0.45: 0.35:0.2 is: a2=49×0.45+43×0.35+47.5×0.2=46.6. Apparently, a2 less than a1, this update is valid, and the management apparatus performs a third update based on FIG. 4B.

Figure 4C:
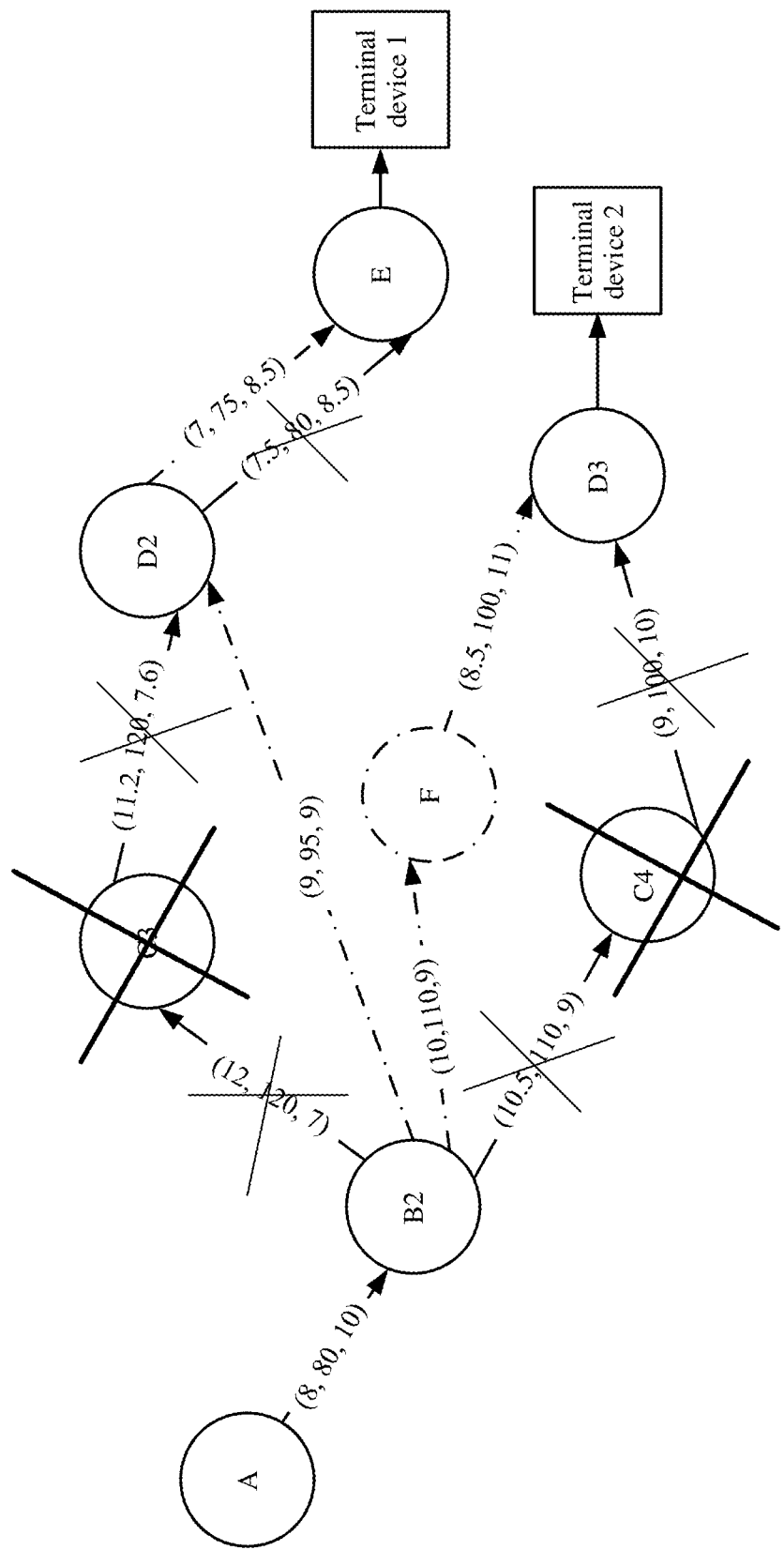
FIG. 4C is a schematic diagram of another embodiment of a data transmission method according to an embodiment of this application.

It is assumed that the third update is shown in FIG. 4C. The management apparatus does not adjust a quantity of the serving nodes or deployment locations of the serving nodes, and the management apparatus adjusts only a bandwidth between the serving node D2 and the serving node E. In other words, a bandwidth "D2-E-(7.5, 80, 8.5)" is changed to D2-E-(7, 75, 8.5). Then, a cost value of the transmission path in this case is calculated, where node deployment costs are: 17+7+6+10+9=49, bandwidth leasing costs are: 8+9+7+10+8.5=42.5, and a network delay is: 10+9+11+9+8.5=47.5. Then, a cost value calculated by using the weighting coefficient with the proportion of 0.45:0.35:0.2 is: a3=49×0.45+42.5×0.35+47.5×0.2=46.425. Obviously, if a3 is less than a2, this update is valid, and the management apparatus performs a fourth update based on FIG. 4C, and the update is repeated for n times until the cost value an converges. Alternatively, when the quantity of update times n is equal to the preset maximum quantity of update times, the management apparatus stops updating the structure parameter, and the structure parameter corresponding to the cost value an is the target structure parameter, and then determines the target transmission path and the change policy based on the target structure parameter.

In some embodiments, when the management apparatus determines the target transmission path by updating the structure parameter, the transit serving node may not be used to transmit the service data, but the central serving node or the transit serving node that stores the service data may be directly connected, by using a router, to the edge serving node that sends the service request of the user, and then the transmission cost value is calculated. In this case, when the transmission cost value of the management apparatus is calculated, only the leasing costs of the edge serving node and the bandwidth between the serving node that stores the service data and the edge serving node need to be considered. Therefore, the transmission cost value in this case is relatively low. However, this is mostly applicable to a case in which service data processing of the current CDN is relatively idle, or a case in which the central serving node or the transit serving node that stores the service data uses the transmission path to transmit the service data to the edge serving node. Generally, a transmission path in which forwarding is not performed by using the transit serving node is relatively busy, and is mostly occupied by a large amount of service data. Therefore, not all central serving nodes or transit serving nodes that store the service data may be directly connected to the edge serving node to form the target transmission path. This is not specifically limited herein.

For ease of further description, FIG. 4C is used as an example for description. It is assumed that the cost value of the transmission path in FIG. 4C converges. In this case, the management apparatus stops performing an update operation on the structure parameter, and determines that the target transmission path is the transmission path shown in FIG. 4C. In addition, the target structure parameter corresponding to the target transmission path is shown in Table 2.

TABLE 2

| Structure parameter item | Quantity | Details | Whether to adjust a function |
|---|---|---|---|
| Central serving node | 1 | A | N |
| Transit serving node | 3 | B1/D2/F | Y |
| Edge serving node | 2 | E/D3 | Y |
| Bandwidth connection | 5 | A-B2-(8, 80, 10); B2-D2-(9, 95, 9); D2-E-(7, 75, 8.5); B2-F-(10, 110, 9); and F-D3-(8.5, 100, 11) | — |

It should be noted that a change policy corresponding to the target transmission path may be directly represented by a target structure parameter table, or may be represented by a series of change operations. For example, the change policy determined by the management apparatus may be a status table of a target CDN, as shown in Table 3, or may be an operation that needs to be performed to change a current CDN to a target CDN, as shown in Table 4. "A-B2-(8, 80, 10)" in Table 3 indicates that costs of a bandwidth from the serving node A to the serving node B2 is 8, and a value of the bandwidth from the serving node A to the serving node B2 is 80, and a delay between the serving node A and the serving node B2 is 10. In Table 3, "converting" means that the serving node has a function of converting a coding scheme of data, "caching" means that the serving node has a function of caching data, and "forwarding" means that the serving node has a function of forwarding data. In addition, "D2-E-(7.5, 80, 8.5)→D2-E-(7, 75, 8.5)" in Table 4 indicates that a value of the bandwidth between the serving node D2 and the serving node E is adjusted from 80 to 75.

TABLE 3

| Structure parameter item | Quantity | Details | Comments |
|---|---|---|---|
| Central serving node | 1 | A | Store service data |
| Transit serving node | 3 | B2 | Converting, caching, and forwarding |
|  |  | D2 | Converting and forwarding |
|  |  | F | Converting, caching, and forwarding |
| Edge serving node | 2 | E | Converting, caching, and forwarding |
|  |  | D3 | Converting and caching |
| Bandwidth connection | 5 | A-B2-(8, 80, 10) B2-D2-(9, 95, 9); D2-E-(7, 75, 8.5); B2-F-(10, 110, 9); and F-D3-(8.5, 100, 11) | — |

TABLE 4

| Node change | Suspend leasing of a serving node C3 Suspend leasing of a serving node C4 Lease a serving node F |
|---|---|
| Bandwidth change | Suspend leasing of B2-C3-(12, 120, 7) Suspend leasing of C3-D2-(11.2, 120, 7.6) Suspend leasing of B2-C4-(10.5, 110, 9) Suspend leasing of C4-D3-(9, 100, 10) Lease B2-D2-(9, 95, 9) Lease B2-F-(10, 110, 9) Lease F-D3-(8.5, 100, 11) D2-E-(7.5, 80, 8.5) E-(7, 75, 8.5) |
| Node function change | Configure a function of converting a coding scheme of data for B2 Configure functions of converting a coding scheme of data, caching data, and forwarding data for F Configure functions of caching data and forwarding data for D2 |

In this embodiment, the function of caching the service data refers to that when the service data is received, the serving node caches the service data to the serving node, so that when the user requests the service data next time, the management apparatus may consider whether the service data may be transmitted from the serving node that caches the service data to another serving node.

In this embodiment, the function of converting the coding scheme of data refers to encoding a video signal into a form of layers, and when the bandwidth is insufficient, only a bitstream at a basic layer is transmitted and decoded. For example, an original video stream is divided into three video streams, where a first stream is a basic stream with a relatively low bit rate and relatively poor quality, but the first stream can be played, and a second stream and a third stream are enhancement layer streams, and may be combined with the stream at the previous layer, to increase a bit rate and improve quality. It should be noted that, if the video stream is divided into three streams, although occupied bandwidth remains unchanged, the video stream may be transmitted through different paths, and then converged at the terminal device of the user. This improves user experience of browsing a video. For example, the first stream may go through a low-delay and high-bandwidth path, and reliability of such a path is relatively high. Then, the second stream and the third stream may separately go through a high-delay and low-bandwidth path, and reliability of such a path is relatively low. In this transmission manner, when the terminal device of the user receives the first stream, although the quality is poor, smooth playing can be achieved at least. Therefore, even if the second stream and the third stream do not catch a play point, the user can only use the first stream for playing, so that user experience is not affected. Therefore, the management apparatus may determine, based on a service type requested by the user, whether distribution transmission is required. It should be noted that the video stream may be converged at the terminal device of the user, or may be converged at the edge serving node. Because some user terminals may not support an SVC decoding function, in this case, the edge serving node may convert the video stream into advanced video coding (advanced video coding, AVC) by using the function of converting the coding scheme of data, and then send the video stream to the terminal device of the user. Because the terminal device of the user supports the AVC decoding, it can be ensured that the terminal device of the user successfully decodes a video resource.

In addition, the function of forwarding data in this embodiment refers to a function that is set for the intermediate node to implement efficiently forwarding, by the serving node, a large amount of service data between the serving nodes. It should be noted that the central serving node is mainly configured to store the service data and send the service data to another serving node. The edge serving node mainly receives data to serve a large quantity of terminal devices, and generally does not need the function of forwarding service data.

It should be understood that step 202 is a virtual computation process inside the management apparatus, and there is no actual change operation on the current CDN. In addition, an objective of the virtual computation process is to compute a change policy from the current CDN to the target CDN. Therefore, after the management apparatus determines the change policy, the management apparatus may further substantially change the current CDN, to obtain the target CDN that can better transmit the service data.

203: The management apparatus changes, based on the change policy, the current CDN managed by the management apparatus to the target CDN.

In this embodiment, after determining the change policy, the management apparatus may change, according to the change policy, the current CDN managed by the management apparatus to the target CDN, where the target CDN includes a plurality of serving nodes corresponding to the target transmission path.

The management apparatus performs at least one of the following change operations according to the change policy.

(1) Suspend leasing of the serving node in the current CDN and suspend leasing of the bandwidth correspondingly connected to the serving node.

(2) Lease the serving node and the bandwidth correspondingly connected to the serving node.

(3) Adjust a bandwidth correspondingly connected between the two serving nodes in the current CDN to the target bandwidth.

(4) Add target functions such as converting a coding scheme of data, caching data, or forwarding data for the serving node.

Specifically, when the current CDN includes a specific serving node, and the change policy indicates that the target CDN does not include the serving node and a bandwidth correspondingly connected to the serving node, the management apparatus performs step (1).

Further, an example in which the change policy is a state table of the target CDN shown in Table 3 is used for description. FIG. 3 is used as an example. A serving node C3 exists in the CDN shown in FIG. 3, but there is no serving node C3 in the serving nodes listed in the change policy shown in Table 3, and there is no bandwidth correspondingly connected to the serving node C3, it indicates that the change policy indicates that the target CDN does not include the serving node C3 and the bandwidth correspondingly connected to the serving node C3. In this case, the management apparatus suspends leasing of the serving node C3 and the bandwidth correspondingly connected to the serving node C3.

Similarly, a specific operation procedure in which the change policy is shown in Table 4 is used as an example for description. The change policy shown in Table 4 directly indicates "suspend leasing of a serving node C3", and it indicates that the serving node C3 exists in the CDN shown in FIG. 3. However, the management apparatus considers that it is better that the serving node C3 does not exist in the target CDN, and therefore the management apparatus suspends leasing of the serving node C3.

Specifically, when the current CDN does not include a specific serving node, and the change policy indicates that the target CDN does not include the serving node and a bandwidth correspondingly connected to the serving node, the management apparatus performs step (2).

Further, an example in which the change policy is a state table of the target CDN shown in Table 3 is used for description. FIG. 3 is used as an example. A serving node F does not exist in the CDN shown in FIG. 3, but there is a serving node F in the serving nodes listed in the change policy shown in Table 3, and there is a bandwidth correspondingly connected to the serving node F, it indicates that the change policy indicates that the target CDN includes the serving node F and the bandwidth correspondingly connected to the serving node F. In this case, the management apparatus leases the serving node F and the bandwidth correspondingly connected to the serving node F.

Similarly, a specific operation procedure in which the change policy is shown in Table 4 is used as an example for description. The change policy shown in Table 4 directly indicates "lease a serving node F", and it indicates that the serving node F does not exist in the CDN shown in FIG. 3. However, the management apparatus considers that it is better that the serving node F exists in the target CDN, and therefore the management apparatus leases the serving node F.

Specifically, when the bandwidth correspondingly connected between the two serving nodes in the target CDN indicated by the change policy is inconsistent with the bandwidth correspondingly connected between the two serving nodes in the current CDN, the management apparatus performs step (3).

Further, an example in which the change policy is a state table of the target CDN shown in Table 3 is used for description. FIG. 3 is used as an example. A bandwidth between the serving node D2 and the serving node E in the CDN shown in FIG. 3 is "D2-E-(7.5, 80, 8.5)". However, a bandwidth between the serving node D2 and the serving node E listed in the change policy shown in Table 3 is "D2-E-(7, 75, 8.5)". This indicates that the management apparatus needs to adjust the bandwidth between the serving node D2 and the serving node E, so that the management apparatus adjusts a value of the bandwidth between the serving node D2 and the serving node E from 75 to 80.

Similarly, a specific operation procedure in which the change policy is shown in Table 4 is used as an example for description. The operation step "D2-E-(7.5, 80, 8.5)→D2-E-(7, 75, 8.5)" in the change policy shown in Table 4 indicates that the management apparatus adjusts the value of the bandwidth between the serving node D2 and the serving node E from 75 to 80.

Specifically, when the change policy indicates that the serving node has the target functions such as converting a coding scheme of data, caching data, or forwarding data, if the current CDN includes a serving node that needs an adjustment function, and the serving node does not have the target function indicated by the change policy, the management apparatus adds the target function to the serving node according to the change policy. If the current CDN does not include the serving node, and after the management apparatus leases the serving node according to the change policy, if the serving node does not have the target function indicated by the change policy, the management apparatus adds the target function to the serving node.

Further, an example in which the change policy is a state table of the target CDN shown in Table 3 is used for description. FIG. 3 is used as an example. A serving node D2 exists in the CDN shown in FIG. 3, a serving node D2 exists in the change policy shown in Table 3, and a remark function of the serving node D2 is "converting and forwarding". It indicates that the management apparatus needs to configure, for the serving node D2, a function of converting a coding scheme of data and a function of forwarding data. In addition, a serving node F exists in the change policy shown in Table 3, and a remark function of the serving node F is "converting, caching, and forwarding". However, there is no serving node F in the CDN shown in FIG. 3. In this case, the management apparatus needs to first determine whether the serving node F is leased, and if the management apparatus has leased the serving node F, the management apparatus only needs to configure, for the serving node F, a function of converting a coding scheme of data, a function of caching service data, and a function of forwarding data, or if the management apparatus does not lease the serving node F, the management apparatus first leases the serving node F, and then configures a corresponding function for the serving node.

Figure 4D:
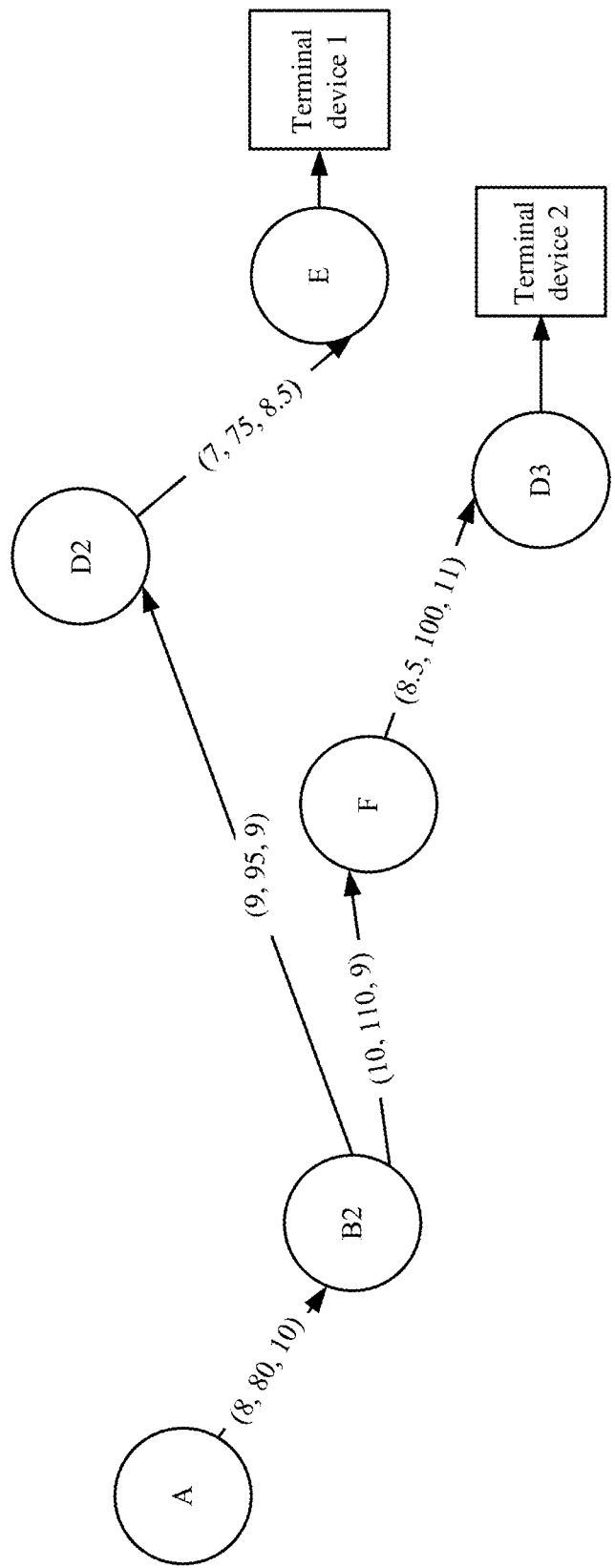
FIG. 4D is a schematic diagram of another embodiment of a data transmission method according to an embodiment of this application.

For ease of understanding, FIG. 3 and FIG. 4D are used as examples for description in this embodiment. The management apparatus needs to change, according to the change policy, the CDN shown in FIG. 3 to the CDN shown in FIG. 4D. It should be noted that, regardless of whether the management apparatus uses the change policy shown in Table 3 or Table 4, the management apparatus may suspend leasing of the serving node C3 and the serving node C4 according to the change policy, and suspend leasing of the bandwidths connected between the two serving nodes: "B2-C3-(12, 120, 7)", "C3-D2-(11.2, 120, 7.6)", "B2-C4-(10.5, 110, 9)", and "C4-D3-(9, 100, 10)". Then, the management apparatus should further lease the serving node F, and lease the bandwidth that has a connection relationship with the serving node F, for example, "B2-F-(10, 110, 9)" and "F-D3-(8.5, 100, 11)". In addition, the management apparatus further needs to lease the bandwidth "B2-D2-(9, 95, 9)" connected between the serving node B2 and the serving node D2, the management apparatus adjusts the bandwidth between the serving node D2 and the serving node E from "D2-E-(7.5, 80, 8.5)" to "D2-E-(7, 75, 8.5)". In other words, the management apparatus adjusts a value of the bandwidth between the serving node D2 and the serving node E from 75 to 80. In this case, the management apparatus should further configure a corresponding function for the serving node, for example, configuring a function of converting a coding scheme of data for B2, configuring a function of converting a coding scheme of data, a function of caching data, and a function of forwarding data for F, and configuring a function of caching data and a function of forwarding data for D2. It should be noted that, the management apparatus may configure a corresponding function for each serving node after leasing all serving nodes that need to be leased, or may configure a corresponding function for the serving node each time a serving node is leased. This is not specifically limited herein.

204: The management apparatus set, according to a routing forwarding rule corresponding to the target transmission path, routing information of a serving node corresponding to the target transmission path.

In this embodiment, the management apparatus may further determine the routing forwarding rule corresponding to the target transmission path, and then sets, according to the routing forwarding rule, the routing information of the serving node corresponding to the target transmission path, so that the serving node on the target transmission path learns of how to forward the service data. The routing forwarding rule may be a routing table. The routing table is an electronic table (file) or a class database sent by the management apparatus to the router, and stores a network address pointing to a next serving node.

In this embodiment, after the target CDN completes configuration change, the management apparatus may indicate the serving node to transmit data to the terminal device. The management apparatus may use the manner in step 205, or may use the manner in step 206. This is not specifically limited herein.

205: The management apparatus sends an indication message to a first serving node in the target CDN, to indicate the first serving node to send the service data to the terminal device through the target transmission path.

In this embodiment, the management apparatus may send the indication message to the first serving node in the target CDN, where the first serving node is a serving node that stores the service data requested by the user, and the serving node may be a central serving node, may be a transit serving node, or may be an edge serving node. This is not specifically limited herein. The indication message carries a network address of a second serving node and identification information of the service data requested by the user. The first serving node receives indication information sent by the management apparatus, indicates the first serving node to find the service data based on the identification information of the service data, and then send, through the target transmission path, the service data to the second serving node indicated by the network address, so that the second serving node sends the service data to the terminal device, where the second serving node is an edge serving node of the target transmission path.

Alternatively, the management apparatus may also use the manner in step 206.

206: The management apparatus sends an indication message to a second serving node in the target CDN, to indicate the second serving node to send the service data to the terminal device, where the service data is transmitted to the second serving node through the target transmission path.

In this embodiment, the management apparatus may further send the indication message to the second serving node in the target CDN, and the second serving node is the edge serving node of the target transmission path. The indication message carries a network address of the first serving node and identification information of the service data requested by the user, and indicates the second serving node to obtain, by using the target transmission path, the service data required by the user from the first serving node indicated by the network address, and send the service data to the terminal device.

In the embodiments, after receiving the service request sent by the terminal device, the management apparatus determines, based on the service request, the target transmission path corresponding to the terminal device, and the change policy required for transmitting data on the target transmission path; and changes the current CDN, according to the change policy, to obtain the target CDN, where the target CDN includes each serving node corresponding to the target transmission path, so that the service data corresponding to the service request may be returned to the terminal device by using the serving node corresponding to the target transmission path in the target CDN. In other words, in this solution, the CDN may be flexibly deployed based on the service requirement, and the transmission path may be selected without limiting to the existing CDN. Therefore, when network traffic surges, a CDN resource can be flexibly used to expand a network capacity in a relatively short time, to avoid affecting user service experience.

Figure 5:
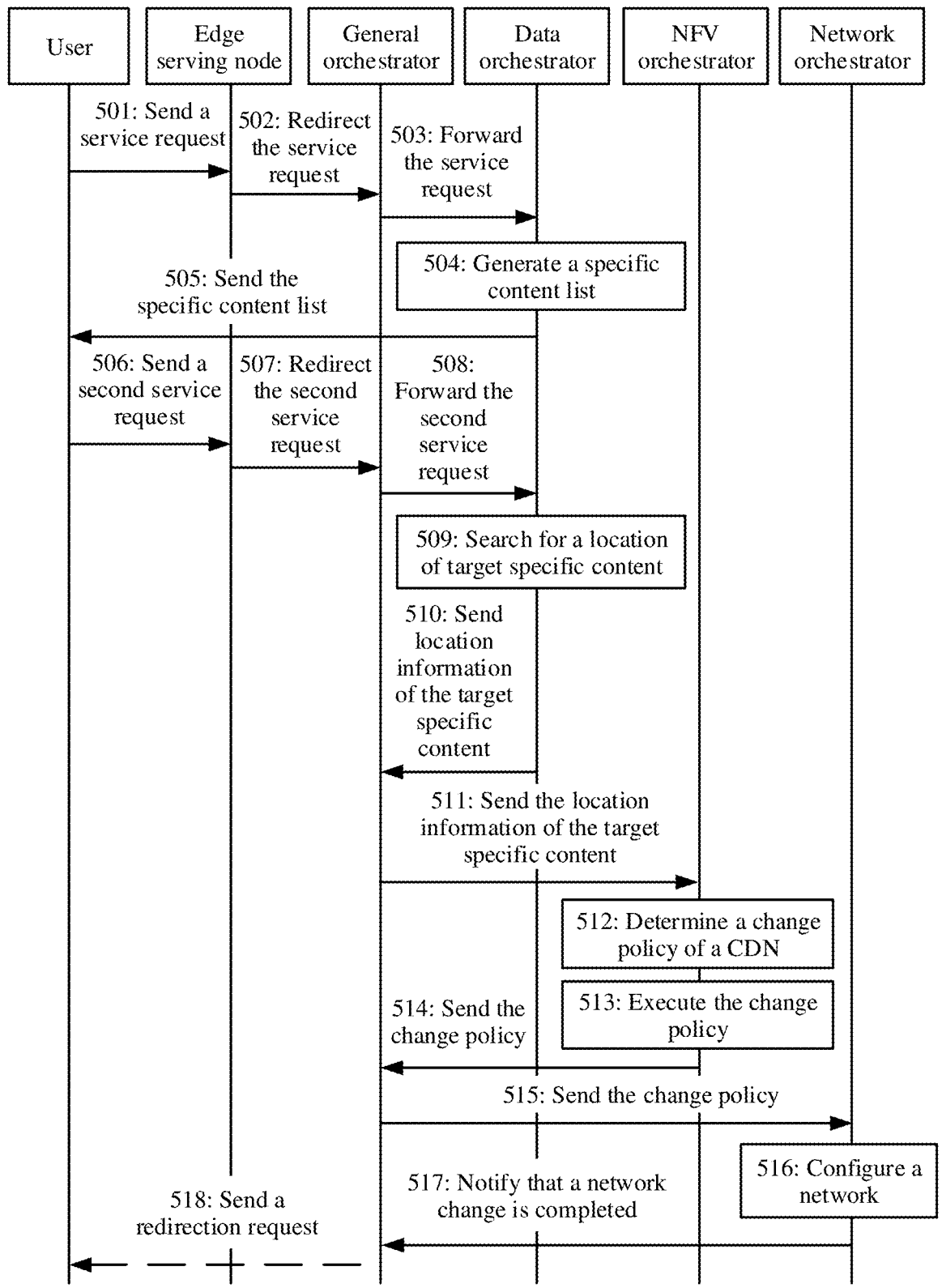
FIG. 5 is another flowchart of a data transmission method according to an embodiment of this application.

For ease of understanding, the method provided in this embodiment of this application is further described by using the procedure shown in FIG. 5.

501: A user sends a service request to an edge serving node.

In this embodiment, when the user needs to request specific service data, the user may send the service request to the edge serving node, where the request is used to prompt the edge serving node that the user needs to request the specific service data. Then, the edge serving node performs step 502.

It should be noted that, in some cases, the service data requested by the user may be cached locally by the edge serving node based on a request of another user. Therefore, in such a case, the edge serving node may directly send the service data requested by the user to the user.

502: The edge serving node sends a redirection service request to a general orchestrator.

In this embodiment, after the edge serving node receives the service request sent by the user, the edge serving node may redirect the service request to the general orchestrator. It should be understood that a main function of the general coordination is to send an instruction to a data orchestrator, an NFV orchestrator, and a network orchestrator, to avoid coupling generated when the data orchestrator, the NFV orchestrator, and the network orchestrator send an instruction to each other. Therefore, the general orchestrator performs step 503.

503: The general orchestrator forwards the service request to the data orchestrator.

In this embodiment, after the general orchestrator receives the redirection request sent by the edge serving node, the general orchestrator forwards the service request to the data orchestrator.

504: The data orchestrator generates a specific content list.

In this embodiment, the data orchestrator may use an internal data structure to generate the specific content list corresponding to the service, where the specific content list includes specific content of the service requested by the user and an attribute of the specific content, for example, a video name, a video size, a video source, and a plurality of resolutions of the video.

505: The data orchestrator sends the specific content list to the user.

In this embodiment, the data orchestrator sends the specific content list corresponding to the service request of the user to the user, so that the user further selects target specific content according to factors such as a size of a player and a quality of a network.

506: The user sends a second service request to the edge serving node.

In this embodiment, after the user determines the target specific content, the user may send the second service request to the edge serving node. The second service request includes at least the target specific content determined by the user based on the specific content list.

507: The edge serving node sends the second service request to the general orchestrator.

In this embodiment, after the edge serving node receives the second service request sent by the user, the edge serving node redirects the second service request to the general orchestrator.

508: The general orchestrator forwards the second service request to the data orchestrator.

In this embodiment, after the general orchestrator receives the redirection request sent by the edge serving node, the general orchestrator forwards the second service request to the data orchestrator.

509: The data orchestrator searches for a location of the target specific content.

In this embodiment, after the data orchestrator receives the second service request of the user, in other words, after the data orchestrator determines the target specific content selected by the user, the data orchestrator searches out the location of the target specific content from a CDN. The location of the target specific content refers to a network address of a serving node that stores the service data requested by the user. It should be understood that the serving node that stores the service data may be a central serving node, a transit serving node, or an edge serving node. It should be further understood that the target specific content requested by the user may be stored in more than one serving node. For example, a part of the target specific content is stored in a central serving node A, and the other part of the target specific content is stored in a transit serving node B. This is not specifically limited herein.

510: The data orchestrator sends location information of the target specific content to the general orchestrator.

In this embodiment, after the data orchestrator determines the location of the target specific content, the data orchestrator may send the location information of the target specific content to the general orchestrator. In addition to the location of the target specific content involved in step 509, the location information of the specific content includes: a storage status of the target specific content in each storage location, namely, a size of memory occupied by the target specific content in the central serving node A for storage, a quantity of times that the target specific content is requested in the central serving node A, a time point at which the target specific content is requested in the central serving node A, a bit rate of the target specific content, and the like.

511: The general orchestrator sends the location information of the target specific content to the NFV orchestrator.

In this embodiment, the general orchestrator sends the location information of the target specific content sent by the data orchestrator to the NFV orchestrator for the NFV orchestrator to formulate a further policy.

512: The NFV orchestrator determines a change policy of the CDN.

In this embodiment, the NFV orchestrator determines a target transmission path and the change policy by using a heuristic policy and a cost minimization algorithm of the CDN. In other words, the NFV orchestrator determines, through calculation, paths and serving nodes through which the target specific content is transmitted to the user, and how to set the CDN to achieve such a transmission effect. Specifically, an input parameter of the cost minimization algorithm of the CDN is a topology structure of a current CDN. The topology structure includes a quantity of central serving nodes, a quantity of transit serving nodes, a quantity of edge serving nodes, and a distribution location of each serving node. In addition to this, the NFV orchestrator may further learn of a bandwidth connected between each two serving nodes and a function of each serving node. A function of the serving node on the path for transmitting the service data to the user, a value of the bandwidth connected between every two serving nodes, and a minimum cost of the CDN that meet a service requirement of the user may be obtained through calculation. More specifically, reference may be made to step 202 in the foregoing description.

It should be noted that, after determining the change policy of the CDN, the NFV orchestrator may first perform step 513 and then perform step 514, or may first perform step 514 and then perform step 513, or may perform step 514 when performing step 513. This is not specifically limited herein.

513: The NFV orchestrator executes the change policy.

In this embodiment, the NFV orchestrator performs some change operations according to the change policy. For example, a quantity and deployment locations of serving nodes in the CDN are adjusted, a bandwidth connected between specific two serving nodes is adjusted, or a function of the serving node in the CDN is modified. Specifically, reference may be made to step 203 in the foregoing description.

514: The NFV orchestrator sends the change policy to the general orchestrator.

In this embodiment, after the NFV orchestrator determines the change policy of the CDN, or after the NFV orchestrator performs some change operations according to the change policy, the NFV orchestrator sends the change policy to the general orchestrator.

515: The general orchestrator sends the change policy to the network orchestrator.

In this embodiment, after the general orchestrator receives the change policy, the general orchestrator forwards the change policy to the network orchestrator.

516. The network orchestrator configures a network.

In this embodiment, the network orchestrator may configure, according to the change policy, a routing rule corresponding to the target transmission path. For details, reference may be made to the foregoing step 204. After both the NFV orchestrator and the network orchestrator complete the change operation, a target CDN is obtained. The target CDN may transmit the target specific content to the user by using the target transmission path, to meet user service requirement.

517: The network orchestrator sends a network change completion notification to the general orchestrator.

In this embodiment, after the network orchestrator completes the network change operation, the network orchestrator sends the network change completion notification to the general orchestrator, to prompt the general orchestrator to indicate each serving node to use the target CDN to transmit the service data to the user.

518: The general orchestrator sends the redirection request to the user.

In this embodiment, if an edge serving node in this case is inconsistent with the edge serving node before the change, the general orchestrator sends the redirection request to the user, to indicate the user to obtain the target specific content by using the new edge serving node. After the user establishes a connection to the edge serving node that returns to the target specific content, the general orchestrator may indicate the serving node on which the target specific content is located to transmit the target specific content to the user. For details, refer to step 205 or step 206 in the foregoing description.

In this embodiment, after receiving the service request sent by the user, the general orchestrator sends the service request to the data orchestrator to determine the target specific content corresponding to the service request, and then the general orchestrator sends the information related to the target specific content to the NFV orchestrator, so that the NFV orchestrator determines the target transmission path and the change policy corresponding to the target transmission path. Then, the NFV orchestrator and the network orchestrator separately execute a corresponding change policy to obtain the target CDN. The target CDN includes each server node corresponding to the target transmission path, so that the target specific content corresponding to the service request may be returned to the terminal device of the user by using the serving node corresponding to the target transmission path in the target CDN. In other words, in this solution, the CDN may be flexibly deployed based on the service requirement, and the transmission path may be selected without limiting to the existing CDN. Therefore, when network traffic surges, a CDN resource can be flexibly used to expand a network capacity in a relatively short time, to avoid affecting user service experience.

Figure 6:
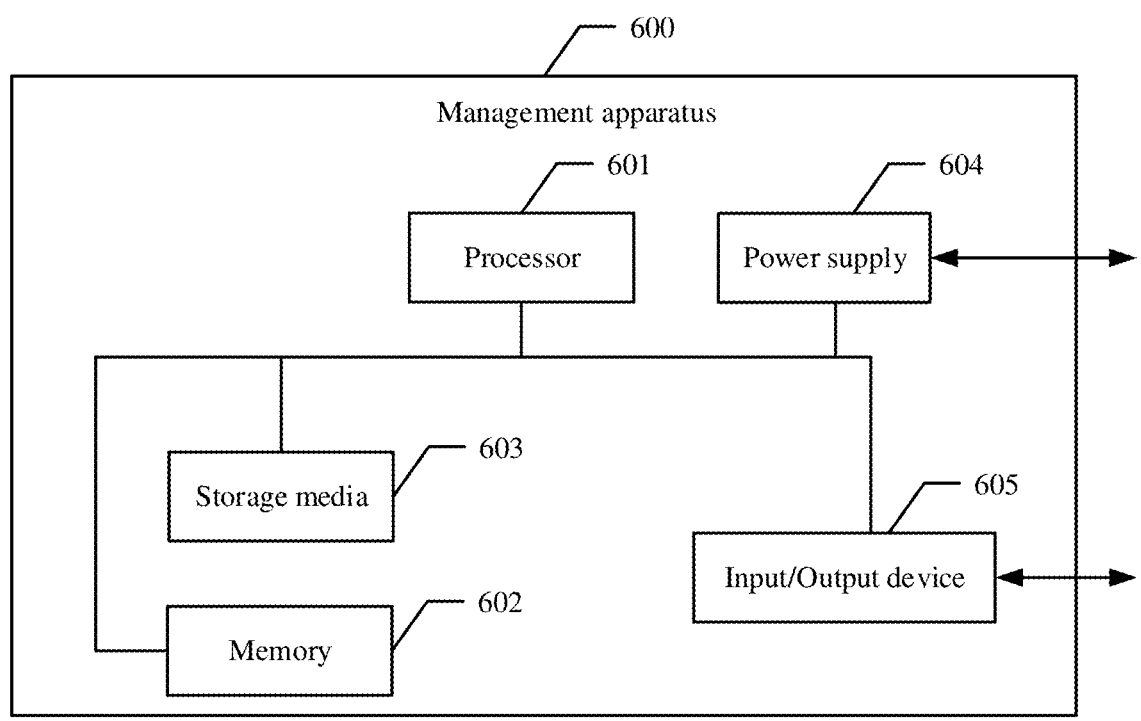
FIG. 6 is a schematic diagram of an embodiment of a management apparatus according to an embodiment of this application.

The following describes a management apparatus 600 in this embodiment. FIG. 6 is a schematic structural diagram of the management apparatus 600 according to this embodiment. The management apparatus 600 may vary greatly due to different configurations or performance, and may include one or more processors (central processing units, CPU) 601, a memory 602, and one or more storage media 603 (for example, one or more mass storage devices) that store an application program or data. The memory 602 and the storage medium 603 each may be transient storage or persistent storage. Still further, the processor 601 may be configured to communicate with the storage medium 603, and the processor 601 is configured to execute an application program in the storage medium 603. Specifically, the input/output device 605 is configured to receive a service request sent by a terminal device;

the memory 602 is configured to store a program; and the processor 601 is configured to execute the program, specifically including the following steps:

determining, based on the service request, a target transmission path of service data corresponding to the service request and a change policy corresponding to the target transmission path; and changing, according to the change policy, a current CDN managed by the management apparatus to a target CDN, where the target CDN includes a plurality of serving nodes corresponding to the target transmission path; and the input/output device 605 is further configured to perform the following steps:

sending an indication message to a first serving node in the target CDN, to indicate the first serving node to send the service data to the terminal device through the target transmission path, where the first serving node stores the service data;

or sending an indication message to a second serving node in the target CDN, to indicate the second serving node to send the service data to the terminal device, where the service data is transmitted to the second serving node through the target transmission path.

It should be understood that the management apparatus 600 may further include one or more power supplies 604, one or more input/output devices 605, and/or one or more operating systems such as Windows Server™, Mac OS X™, Unix™, Linux™, and FreeBSD™.

It should be further understood that, in the method embodiment corresponding to FIG. 2 or FIG. 5, all steps performed by the management apparatus may be based on a structure of the management apparatus 600 shown in FIG. 6.

In this embodiment, after the input/output device in the management apparatus receives the service request sent by the terminal device, the processor in the management apparatus determines, based on the service request, the target transmission path corresponding to the terminal device, and the change policy required for transmitting data on the target transmission path; and changes the current CDN, according to the change policy, to obtain the target CDN, where the target CDN includes each serving node corresponding to the target transmission path, so that the service data corresponding to the service request may be returned to the terminal device by using the serving node corresponding to the target transmission path in the target CDN. In other words, in this solution, the CDN may be flexibly deployed based on the service requirement, and the transmission path may be selected without limiting to the existing CDN. Therefore, when network traffic surges, a CDN resource can be flexibly used to expand a network capacity in a relatively short time, to avoid affecting user service experience.

Figure 7:
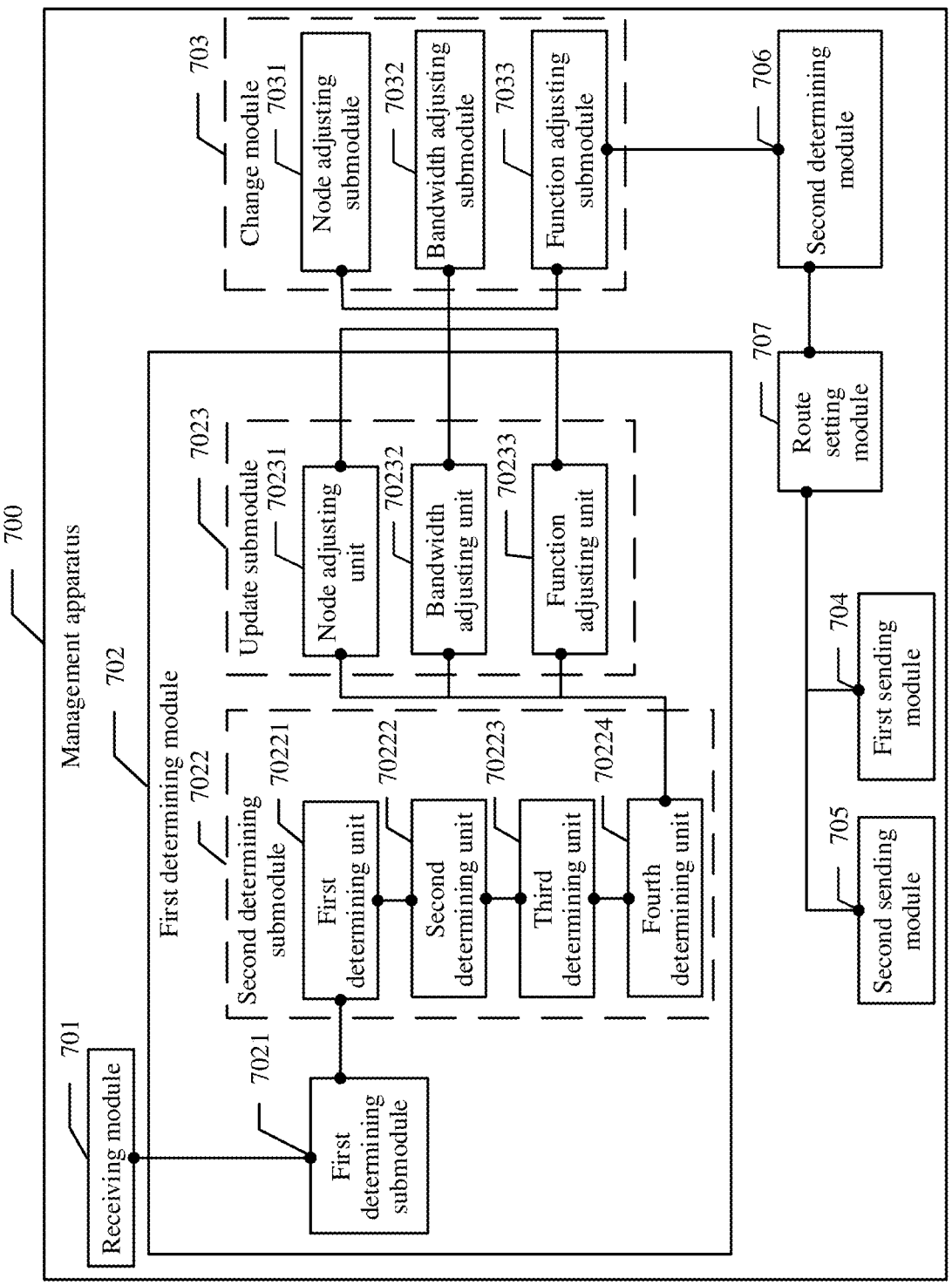
FIG. 7 is a schematic diagram of another embodiment of a management apparatus according to an embodiment of this application.

The following describes a management apparatus 700 in this embodiment. As shown in FIG. 7, an embodiment of the management apparatus 700 in this embodiment includes:

a receiving module 701, configured to receive a service request sent by a terminal device;

a first determining module 702, configured to determine, based on the service request, a target transmission path of service data corresponding to the service request and a change policy corresponding to the target transmission path;

a change module 703, configured to change, according to the change policy, a current CDN managed by the management apparatus to a target CDN, where the target CDN includes a plurality of serving nodes corresponding to the target transmission path; and a first sending module 704, configured to send an indication message to a first serving node in the target CDN, to indicate the first serving node to send the service data to the terminal device through the target transmission path, where the first serving node stores the service data;

or a second sending module 705, configured to send an indication message to a second serving node in the target CDN, to indicate the second serving node to send the service data to the terminal device, where the service data is transmitted to the second serving node through the target transmission path.

The first determining module 702 includes:

a first determining submodule 7021, configured to determine an initial structure parameter, where the structure parameter is used to indicate structure composition of a CDN, and the initial structure parameter is a structure parameter corresponding to the current CDN;

a second determining submodule 7022, configured to determine an initial transmission cost value based on the service request and the initial structure parameter, where the transmission cost value is a minimum cost value required for returning the service data to the terminal device in the CDN indicated by the structure parameter; and an update submodule 7023, configured to update the structure parameter for N times to obtain a target structure parameter, and determine the target transmission path and the change policy based on the target structure parameter, where N is a quantity of update times required for converging the transmission cost value, or a preset maximum quantity of update times, the target transmission path is a transmission path corresponding to a target transmission cost value, the target transmission cost value is a transmission cost value determined based on the target structure parameter, and the change policy includes the target structure parameter or a change operation corresponding to the N times of update.

The structure parameter includes at least one of the following: a quantity of central serving nodes, a quantity of transit serving nodes, a quantity of edge serving nodes, a bandwidth connected between serving nodes, and a service function of a serving node.

The update submodule 7023 includes at least one of the following units:

a node adjusting unit 70231, configured to adjust a quantity of serving nodes, where the serving node includes a central serving node, a transit serving node, or an edge serving node;

a bandwidth adjusting unit 70232, configured to adjust a value of a bandwidth connected between at least two serving nodes; and a function adjusting unit 70233, configured to add at least one of the following service functions for at least one serving node: converting a coding scheme of data, caching data, and forwarding data.

The second determining submodule 7022 includes:

a first determining unit 70221, configured to determine a bandwidth requirement corresponding to the service request;

a second determining unit 70222, configured to determine at least one transmission scheme that meets the bandwidth requirement and that is in the CDN indicated by the initial structure parameter;

a third determining unit 70223, configured to determine, based on serving node deployment costs, bandwidth leasing costs, and a network delay, a cost value corresponding to each transmission scheme; and a fourth determining unit 70224, configured to determine a minimum value of the cost value as the initial transmission cost value.

When the change policy is used to indicate that the target CDN does not include a third serving node and a bandwidth correspondingly connected to the third serving node, the update module 703 includes:

a node adjusting submodule 7031, configured to: when the current CDN includes the third serving node, suspend, according to the change policy, leasing of the third serving node in the current CDN and the bandwidth correspondingly connected to the third serving node.

When the change policy is used to indicate that the target CDN includes a fourth serving node and a bandwidth correspondingly connected to the fourth serving node, the update module 703 includes:

the node adjusting submodule 7031, further configured to: when the current CDN does not include the fourth serving node, lease, according to the change policy, the fourth serving node and the bandwidth correspondingly connected to the fourth serving node, where the target transmission path includes the fourth serving node.

When the change policy is used to indicate a target bandwidth correspondingly connected between at least two serving nodes in the target CDN, the update module 703 includes:

a bandwidth adjusting submodule 7032, configured to: when the current CDN includes the at least two serving nodes, and a value of a bandwidth correspondingly connected between the at least two serving nodes in the current CDN is inconsistent with a value of the target bandwidth, adjust, according to the change policy, the bandwidth correspondingly connected between the at least two serving nodes in the current CDN to the target bandwidth, where the target transmission path includes the at least two serving nodes.

When the change policy is used to indicate a target function corresponding to a fifth serving node in the target CDN, the change module 703 includes:

a function adjusting submodule 7033, configured to: when the current CDN includes the fifth serving node, and the fifth serving node does not have the target function, add the target function to the fifth serving node according to the change policy, where the target function includes at least one of the following: converting a coding scheme of data, caching data, and forwarding data, and the target transmission path includes the fifth serving node; or a function adjusting submodule 7033, configured to: when the current CDN does not include the fifth serving node, after the node adjustment submodule 7031 leases the fifth serving node according to the change policy, if the fifth serving node does not have the target function, add the target function to the fifth serving node, where the target function includes at least one of the following: converting a coding scheme of data, caching data, and forwarding data, and the target transmission path includes the fifth serving node.

The management apparatus further includes:

a second determining module 706, configured to determine a routing forwarding rule corresponding to the target transmission path; and a route setting module 707, configured to set, according to the routing forwarding rule, routing information of the serving nodes corresponding to the target transmission path.

The first sending module 704 includes:

an indication submodule 7041, configured to indicate the first serving node to send the service data to the second serving node through the target transmission path, so that the second serving node sends the service data to the terminal device, where the second serving node is an edge serving node of the target transmission path.

In this embodiment, after the receiving module 701 in the management apparatus 700 receives the service request sent by the terminal device, the first determining module 702 determines, based on the service request, the target transmission path corresponding to the terminal device, and the change policy required for transmitting data on the target transmission path; and then the change module 703 changes the current CDN, according to the change policy, to obtain the target CDN, where the target CDN includes each serving node corresponding to the target transmission path, so that the service data corresponding to the service request may be returned to the terminal device by using the serving node corresponding to the target transmission path in the target CDN. In other words, in this solution, the CDN may be flexibly deployed based on the service requirement, and the transmission path may be selected without limiting to the existing CDN. Therefore, when network traffic surges, a CDN resource can be flexibly used to expand a network capacity in a relatively short time, to avoid affecting user service experience.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data transmission method, comprising:
receiving, by a management apparatus, a service request sent by a terminal device;
determining, by the management apparatus based on the service request, a target transmission path of service data corresponding to the service request and a change policy corresponding to the target transmission path;
changing, by the management apparatus according to the change policy, a current content delivery network (CDN) managed by the management apparatus to a target CDN, wherein the target CDN comprises a plurality of serving nodes corresponding to the target transmission path; and
sending, by the management apparatus, an indication message to a first serving node in the target CDN, to indicate the first serving node to send the service data to the terminal device through the target transmission path, wherein the first serving node stores the service data; or
sending, by the management apparatus, an indication message to a second serving node in the target CDN, to indicate the second serving node to send the service data to the terminal device, wherein the service data is transmitted to the second serving node through the target transmission path, wherein the change policy is used to indicate a target bandwidth correspondingly connected between at least two serving nodes in the target CDN, and the changing, by the management apparatus according to the change policy, of the current CDN managed by the management apparatus to the target CDN comprises:

based on a determination that the current CDN comprises the at least two serving nodes, and a value of a bandwidth correspondingly connected between the at least two serving nodes in the current CDN is inconsistent with a value of the target bandwidth, adjusting, by the management apparatus according to the change policy, the bandwidth correspondingly connected between the at least two serving nodes in the current CDN to the target bandwidth, wherein the target transmission path comprises the at least two serving nodes.

2. The method according to claim 1, wherein the determining, by the management apparatus based on the service request, of the target transmission path of service data corresponding to the service request and the change policy corresponding to the target transmission path comprises:

determining, by the management apparatus, an initial structure parameter, wherein the initial structure parameter is used to indicate a structure composition of the current CDN;

determining, by the management apparatus, an initial transmission cost value based on the service request and the initial structure parameter, wherein the transmission cost value is a minimum cost value required for returning the service data to the terminal device in the current CDN; and updating, by the management apparatus, the initial structure parameter for N times to obtain a target structure parameter, and determining the target transmission path and the change policy based on the target structure parameter, wherein N is a quantity of update times required for converging the transmission cost value, or a preset maximum quantity of update times, the target transmission path is a transmission path corresponding to a target transmission cost value, the target transmission cost value is determined based on the target structure parameter, and the change policy comprises the target structure parameter or a change operation corresponding to the N quantity of update times.

3. The method according to claim 2, wherein the structure parameter comprises at least one of the following: a quantity of central serving nodes, a quantity of transit serving nodes, a quantity of edge serving nodes, a bandwidth connected between serving nodes, and a service function of a serving node.

4. The method according to claim 2, wherein the updating, by the management apparatus, the initial structure parameter for N quantity of update times to obtain the target structure parameter comprises at least one of the following:

adjusting, by the management apparatus, a quantity and deployment locations of serving nodes, wherein the first serving node or the second serving node comprises a central serving node, a transit serving node, or an edge serving node;

adjusting, by the management apparatus, a value of a bandwidth connected between at least two serving nodes; and adding, by the management apparatus, at least one service function for at least one of the serving nodes, the at least one service function comprising at least one of converting a coding scheme of data, caching data, and forwarding data.

5. The method according to claim 2, wherein the determining, by the management apparatus, of the initial transmission cost value based on the service request and the initial structure parameter comprises:

determining, by the management apparatus, a bandwidth requirement corresponding to the service request;

determining, by the management apparatus, at least one transmission scheme that meets the bandwidth requirement and that is in the CDN indicated by the initial structure parameter;

determining, by the management apparatus based on serving node deployment costs, bandwidth leasing costs, and a network delay, a cost value corresponding to each transmission scheme; and determining, by the management apparatus, a minimum value of the cost value as the initial transmission cost value.

6. The method according to claim 1, wherein the change policy is used to indicate that the target CDN does not comprise a third serving node and a bandwidth correspondingly connected to the third serving node; and the changing, by the management apparatus according to the change policy, of the current CDN managed by the management apparatus to the target CDN comprises:

based on a determination that the current CDN comprises the third serving node, suspending, by the management apparatus according to the change policy, leasing of the third serving node in the current CDN and the bandwidth correspondingly connected to the third serving node.

7. The method according to claim 1, wherein the change policy is used to indicate that the target CDN comprises a fourth serving node and a bandwidth correspondingly connected to the fourth serving node; and the changing, by the management apparatus according to the change policy, of the current CDN managed by the management apparatus to the target CDN comprises:

based on a determination that the current CDN does not comprise the fourth serving node, leasing, by the management apparatus according to the change policy, the fourth serving node and the bandwidth correspondingly connected to the fourth serving node, wherein the target transmission path comprises the fourth serving node.

8. The method according to claim 1, wherein the change policy is used to indicate a target function corresponding to a fifth serving node in the target CDN; and the changing, by the management apparatus according to the change policy, of the current CDN managed by the management apparatus to the target CDN comprises:

based on a determination that the current CDN comprises the fifth serving node, and the fifth serving node does not have the target function, adding, by the management apparatus, the target function to the fifth serving node according to the change policy; or based on a determination that the current CDN does not comprise the fifth serving node, after the management apparatus leases the fifth serving node according to the change policy, and based on a determination that the fifth serving node does not have the target function, adding, by the management apparatus, the target function to the fifth serving node, wherein the target function comprises at least one of converting a coding scheme of data, caching data, and forwarding data, and the target transmission path comprises the fifth serving node.

9. The method according to claim 1, wherein after the determining, by the management apparatus based on the service request, of the target transmission path of service data corresponding to the service request and the change policy corresponding to the target transmission path, the method further comprises:
   determining, by the management apparatus, a routing forwarding rule corresponding to the target transmission path; and
   setting, by the management apparatus according to the routing forwarding rule, routing information of the serving nodes corresponding to the target transmission path.

10. The method according to claim 1, wherein the indicating the first serving node to send the service data to the terminal device through the target transmission path comprises:
    indicating, by the management apparatus, the first serving node to send the service data to the second serving node through the target transmission path, so that the second serving node sends the service data to the terminal device, wherein the second serving node is an edge serving node of the target transmission path.

11. A management apparatus, comprising:
    a processor;
    a memory having computer readable instructions stored thereon; and
    an input/output device, wherein the input/output device is configured to receive a service request sent by a terminal device, and when the processor executes the computer readable instructions, the management apparatus is caused to perform the following steps:
    determining, based on the service request, a target transmission path of service data corresponding to the service request and a change policy corresponding to the target transmission path; and
    changing, according to the change policy, a current content delivery network (CDN) managed by the management apparatus to a target CDN, wherein the target CDN comprises a plurality of serving nodes corresponding to the target transmission path;
    sending an indication message to a first serving node in the target CDN, to indicate the first serving node to send the service data to the terminal device through the target transmission path, wherein the first serving node stores the service data; and
    sending an indication message to a second serving node in the target CDN, to indicate the second serving node to send the service data to the terminal device, wherein the service data is transmitted to the second serving node through the target transmission path,
    wherein
    the change policy is used to indicate a target bandwidth correspondingly connected between at least two serving nodes in the target CDN, and
    the changing, according to the change policy, of the current CDN managed by the management apparatus to the target CDN comprises:
       based on a determination that the current CDN comprises the at least two serving nodes, and a value of a bandwidth correspondingly connected between the at least two serving nodes in the current CDN is inconsistent with a value of the target bandwidth,
       adjusting, by the management apparatus according to the change policy, the bandwidth correspondingly connected between the at least two serving nodes in the current CDN to the target bandwidth, wherein the target transmission path comprises the at least two serving nodes.

12. The management apparatus according to claim 11, wherein the management apparatus is further caused to perform the following steps:
    determining an initial structure parameter, wherein the initial structure parameter is used to indicate a structure composition of the current CDN;
    determining an initial transmission cost value based on the service request and the initial structure parameter, wherein the transmission cost value is a minimum cost value required for returning the service data to the terminal device in the in the current CDN; and
    updating the initial structure parameter for N times to obtain a target structure parameter, and determine the target transmission path and the change policy based on the target structure parameter, wherein N is a quantity of update times required for converging the transmission cost value, or a preset maximum quantity of update times, the target transmission path is a transmission path corresponding to a target transmission cost value, the target transmission cost value is determined based on the target structure parameter, and the change policy comprises the target structure parameter or a change operation corresponding to the N quantity of update times.

13. The management apparatus according to claim 12, wherein the structure parameter comprises at least one of the following: a quantity of central serving nodes, a quantity of transit serving nodes, a quantity of edge serving nodes, a bandwidth connected between serving nodes, and a service function of a serving node.

14. The management apparatus according to claim 12, wherein the management apparatus is further caused to perform at least one of the following:
    adjusting a quantity and deployment locations of serving nodes, wherein the first serving node or the second serving node comprises a central serving node, a transit serving node, or an edge serving node;
    adjusting a value of a bandwidth connected between at least two serving nodes; and
    adding at least one service function for at least one of the serving nodes, the at least one service function comprising at least one of converting a coding scheme of data, caching data, and forwarding data.

15. The management apparatus according to claim 12, wherein the management apparatus is further caused to:
    determine a bandwidth requirement corresponding to the service request;
    determine at least one transmission scheme that meets the bandwidth requirement and that is in the CDN indicated by the initial structure parameter;
    determine, based on serving node deployment costs, bandwidth leasing costs, and a network delay, a cost value corresponding to each transmission scheme; and
    determine a minimum value of the cost value as the initial transmission cost value.

16. The management apparatus according to claim 11, wherein the management apparatus is further caused to perform at least one of the following:
    when the change policy is used to indicate that the target CDN does not comprise a third serving node and a bandwidth correspondingly connected to the third serving node, and based on a determination that the current CDN comprises the third serving node, suspending, according to the change policy, leasing of the third serving node in the current CDN and the bandwidth correspondingly connected to the third serving node;

when the change policy is used to indicate that the target CDN comprises a fourth serving node and a bandwidth correspondingly connected to the fourth serving node, and based on a determination that the current CDN does not comprise the fourth serving node, leasing, according to the change policy, the fourth serving node and the bandwidth correspondingly connected to the fourth serving node, wherein the target transmission path comprises the fourth serving node; and when the change policy is used to indicate a target function corresponding to a fifth serving node in the target CDN, and based on a determination that the current CDN comprises the fifth serving node, and the fifth serving node does not have the target function, adding the target function to the fifth serving node according to the change policy; or based on a determination that the current CDN does not comprise the fifth serving node, after the management apparatus leases the fifth serving node according to the change policy, and based on a determination that the fifth serving node does not have the target function, adding the target function to the fifth serving node, wherein the target function comprises at least one of converting a coding scheme of data, caching data, and forwarding data, and the target transmission path comprises the fifth serving node.

17. The management apparatus according to claim 11, wherein the management apparatus is further caused to perform the following steps:

determining a routing forwarding rule corresponding to the target transmission path; and setting, according to the routing forwarding rule, routing information of the serving nodes corresponding to the target transmission path.

18. The management apparatus according to claim 11, wherein the management apparatus is further caused to perform the following steps:

indicating the first serving node to send the service data to the second serving node through the target transmission path, so that the second serving node sends the service data to the terminal device, wherein the second serving node is an edge serving node of the target transmission path.

19. A content delivery network (CDN) management system, comprising a management apparatus, comprising a processor and a memory having instructions stored thereon;

a first serving node; and
a second serving node,
wherein
the management apparatus is connected to the first serving node by way of a network, the management apparatus is connected to the second serving node by way of the network, and the first serving node is connected to the second serving node by way of a link configured by the management apparatus;

the first serving node is configured to store service data;

the second serving node is configured to send the service data to a terminal device; and when the processor executes the computer readable instructions, the management apparatus is caused to perform the following steps:

determining, based on the service request, a target transmission path of service data corresponding to the service request and a change policy corresponding to the target transmission path; and changing, according to the change policy, a current content delivery network (CDN) managed by the management apparatus to a target CDN, wherein the target CDN comprises a plurality of serving nodes corresponding to the target transmission path;

sending an indication message to a first serving node in the target CDN, to indicate the first serving node to send the service data to the terminal device through the target transmission path, wherein the first serving node stores the service data; and sending an indication message to a second serving node in the target CDN, to indicate the second serving node to send the service data to the terminal device, wherein the service data is transmitted to the second serving node through the target transmission path, wherein the change policy is used to indicate a target bandwidth correspondingly connected between at least two serving nodes in the target CDN, and the changing, according to the change policy, of the current CDN managed by the management apparatus to the target CDN comprises:

based on a determination that the current CDN comprises the at least two serving nodes, and a value of a bandwidth correspondingly connected between the at least two serving nodes in the current CDN is inconsistent with a value of the target bandwidth, adjusting, by the management apparatus according to the change policy, the bandwidth correspondingly connected between the at least two serving nodes in the current CDN to the target bandwidth, wherein the target transmission path comprises the at least two serving nodes.

\* \* \* \* \*